(12) United States Patent
Miyaguchi et al.

(10) Patent No.: US 6,353,784 B1
(45) Date of Patent: *Mar. 5, 2002

(54) CONTROL APPARATUS OF OCCUPANT PROTECTION DEVICE

(75) Inventors: Koichi Miyaguchi; Yasumasa Kanameda; Joerg Heckel; Masami Okano, all of Tomioka; Sadao Ikeya, Higashimatsuyama, all of (JP)

(73) Assignee: Bosch Electronics Corporation, Gunma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,316

(22) Filed: May 22, 2000

(30) Foreign Application Priority Data

Jun. 3, 1999 (JP) ............................................. 11-156106

(51) Int. Cl.$^7$ ............................................. B60R 21/32
(52) U.S. Cl. ......................... 701/45; 701/46; 280/728.1; 307/10.1
(58) Field of Search ............................. 701/45, 46, 47, 701/36; 280/734, 735, 728.1; 180/271, 282; 307/10.1

(56) References Cited

U.S. PATENT DOCUMENTS 5,182,459 A * 1/1993 Okano et al. ............... 307/10.1
5,424,583 A * 6/1995 Spies et al. ................. 307/10.1
5,431,441 A * 7/1995 Okano ......................... 280/735
5,483,451 A * 1/1996 Ohmae et al. ................ 701/45
6,256,564 B1 * 7/2001 Miyaguchi et al. ........... 701/45

FOREIGN PATENT DOCUMENTS

JP         A885414        4/1996

* cited by examiner

*Primary Examiner*—Jacques H. Louis-Jacques

(57) ABSTRACT

A control apparatus of an occupant protection device has at least one front acceleration sensor provided in a front part of a vehicle in addition to a room acceleration sensor provided in a room of the vehicle. The front acceleration sensor detects an acceleration of the vehicle and gives the control unit a sensor output representative thereof. The control unit, when the sensor output of the front acceleration sensor is a sensor output caused by a collision of the vehicle, detects a variational quantity of the sensor output of the front acceleration sensor based on sensor outputs of the front acceleration sensor at two different time points, and increases an integrated value of an acceleration signal of the room acceleration sensor based on the variational quantity. Then, when the integrated value of the room acceleration sensor exceeds a threshold value, the occupant protection device is driven.

50 Claims, 23 Drawing Sheets

CONTROL APPARATUS OF OCCUPANT PROTECTION DEVICE

BACKGROUND OF THE INVENTION

The present invention relates to a control apparatus for controlling an occupant protection device of a vehicle, such as an airbag and a seat-belt tensioner.

A conventional control apparatus for controlling an occupant protection device, as shown in The Japanese Patent Laid Open Publication No.8-85414, for example, has an acceleration sensor provided on a floor tunnel in a car room. The acceleration sensor detects an acceleration operating to a car body through the floor tunnel, and gives an analog signal representative of the acceleration to the control apparatus. The control apparatus integrates the acceleration signal from the acceleration sensor, detects occurrence of a collision requiring a drive of an occupant protection device based on a comparison between an integrated value of the acceleration signal and a predetermined collision decision threshold value, and drives the occupant protection device such as an airbag.

By the way, when an impact of collision is absorbed by a crush of a collision part of the car body, it can be assumed that a collision acceleration transmitted to the floor tunnel is weakened. In such a case, since an acceleration detected by the acceleration sensor provided on the floor tunnel is small, though there is no fear of it causing difficulties in occupant protection at time of collision, a fear of causing a delay in driving the occupant protection device exists. In particular, a collision, such as an offset collision or an oblique collision, tends to cause a case in which the acceleration transmitted to the floor tunnel is weakened. Because of this, from the viewpoint of improving control of the occupant protection device, regardless of whether the collision acceleration transmitted to the acceleration sensor provided in the car room is weakened, an exact control of the occupant protection device is desired.

SUMMARY OF THE INVENTION

It is an object of the present invention to provide an improved control apparatus of an occupant protection device.

Another object of the present invention is to provide a control apparatus that can exactly control the occupant protection device, regardless of whether a collision acceleration transmitted to an acceleration sensor provided in a car room is weakened.

The above and other objects are attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and giving a sensor output representative thereof; and a control unit, connected to said room acceleration sensor and said front acceleration sensor, for inputting the acceleration signal of said room acceleration sensor and the sensor output of said front acceleration sensor, and for driving the occupant protection device when an integrated value of the acceleration signal of said room acceleration sensor exceeds a predetermined threshold value, said control unit detecting a variational quantity of the sensor output of said front acceleration sensor based on sensor outputs of said front acceleration sensor at two different time points when the sensor output of said front acceleration sensor is a sensor output caused by a collision of the vehicle, and increasing the integrated value of said room acceleration sensor based on the variational quantity of said front acceleration sensor.

According to a composition like this, when the sensor output of the front acceleration sensor is a sensor output caused by a collision, the variational quantity of the sensor output of the front acceleration sensor is detected based on sensor outputs of the front acceleration sensor at two different time points. Then, the integrated value of the acceleration signal of the room acceleration sensor is increased based on the variational quantity of the front acceleration sensor. Since the front acceleration sensor is provided in the front part of the vehicle, even when a collision acceleration transmitted to the room acceleration sensor is weakened, the front acceleration sensor detects the collision acceleration early and gives the sensor output to the control unit. By this, since the integrated value of the room acceleration sensor is increased based on the variational quantity of the front acceleration sensor, the control unit can drive the occupant protection device without causing delay in collision decision.

The above and other objects are also attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and giving a sensor output representative thereof; and a control unit, connected to said room acceleration sensor and said front acceleration sensor, for inputting the acceleration signal of said room acceleration sensor and the sensor output of said front acceleration sensor, and for driving the occupant protection device when an integrated value of the acceleration signal of said room acceleration sensor exceeds a threshold value, said control unit detecting a variational quantity of the sensor output of said front acceleration sensor based on sensor outputs of said front acceleration sensor at two different time points when the sensor output of said front acceleration sensor is a sensor output caused by a collision of the vehicle, and decreasing the threshold value toward the integrated value of the room acceleration sensor based on the variational quantity of said front acceleration sensor.

According to a composition like this, the threshold value toward the integrated value of the acceleration signal of the room acceleration sensor is decreased based on the variational quantity of the sensor output of the front acceleration sensor. Because of this, the integrated value of the room acceleration sensor exceeds the threshold value without causing delay, and the occupant protection device is exactly driven.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
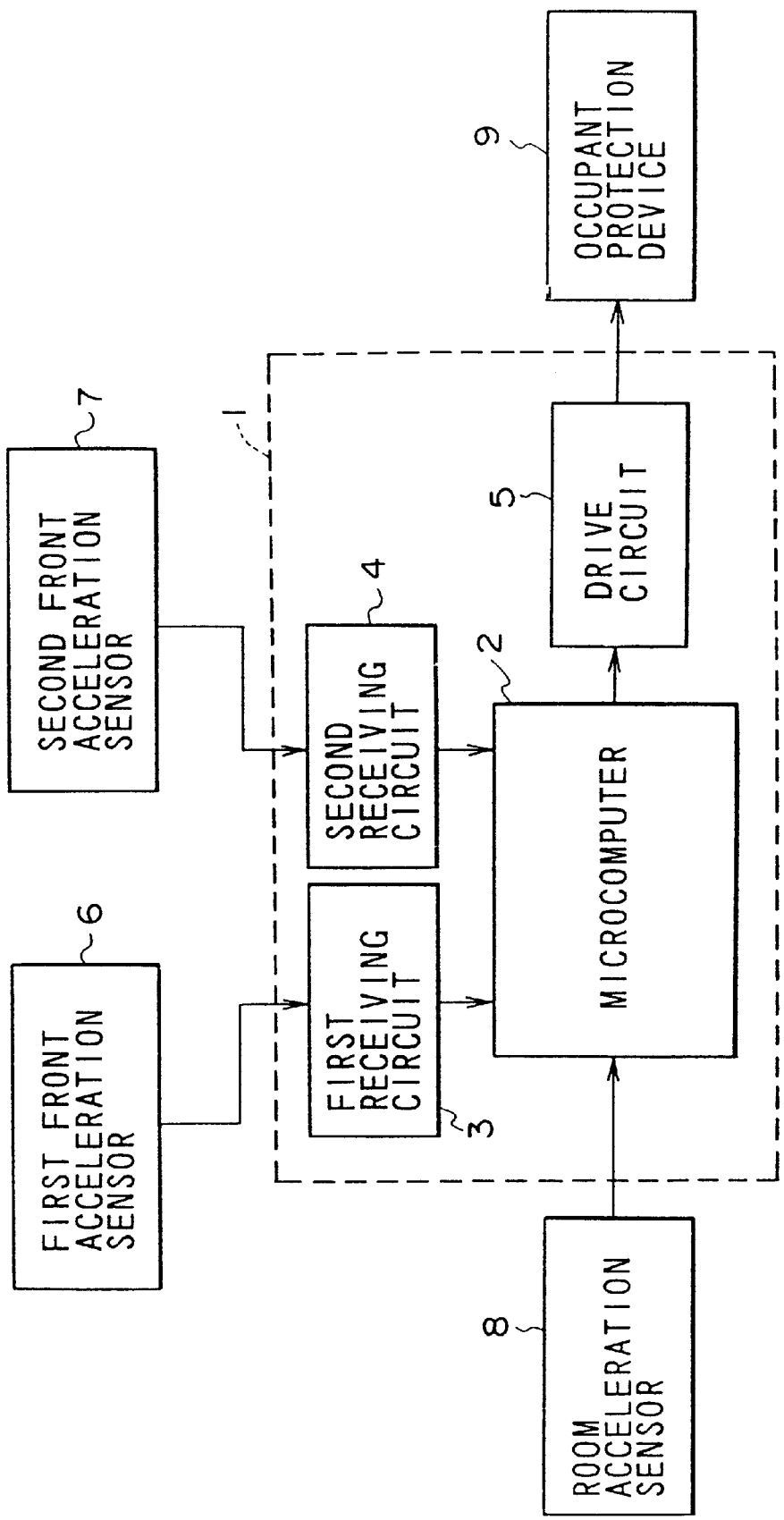
FIG. 1 is a block diagram showing a first embodiment of the present invention.

In FIG. 1, a reference numeral 1 is a control unit. The control unit 1 has a microcomputer 2, first and second receiving circuits 3 and 4, and a drive circuit 5. The microcomputer 2 inputs sensor outputs of first and second front acceleration sensors 6 and 7 by way of the first and second receiving circuits 3 and 4, inputs a sensor output of a room acceleration sensor 8, and gives a collision detection signal to the drive circuit 5 based on the sensor outputs of the acceleration sensors 6–8. The drive circuit 5, when the collision detection signal is input, outputs a drive signal to an occupant protection device 9, and thereby the occupant protection device 9 is driven. The occupant protection device 9 concretely is an airbag or a seat-belt tensioner. The control unit 1 is provided on a floor tunnel in a car room.

The first and second front acceleration sensors 6 and 7 are provided at front parts of a vehicle, for example, at left and right ends of a radiator mount maintaining a radiator, respectively, so that the first and second front acceleration sensors 6 and 7 can detect a collision acceleration early in case of a collision, such as an offset collision and an oblique collision. Therefore, for example, the first front acceleration sensor 6 is positioned near a left fender of the front part of the vehicle, and the second front acceleration sensor 7 is positioned near a right fender of the front part of the vehicle. Since the first and second front acceleration sensors 6 and 7 have a temperature compensation function as described below, the front acceleration sensors 6 and 7 can be provided without requiring a consideration whether they receive heat from an engine. The first and second front acceleration sensors 6 and 7 each have a circuit composition shown in FIG. 2.

Figure 2:
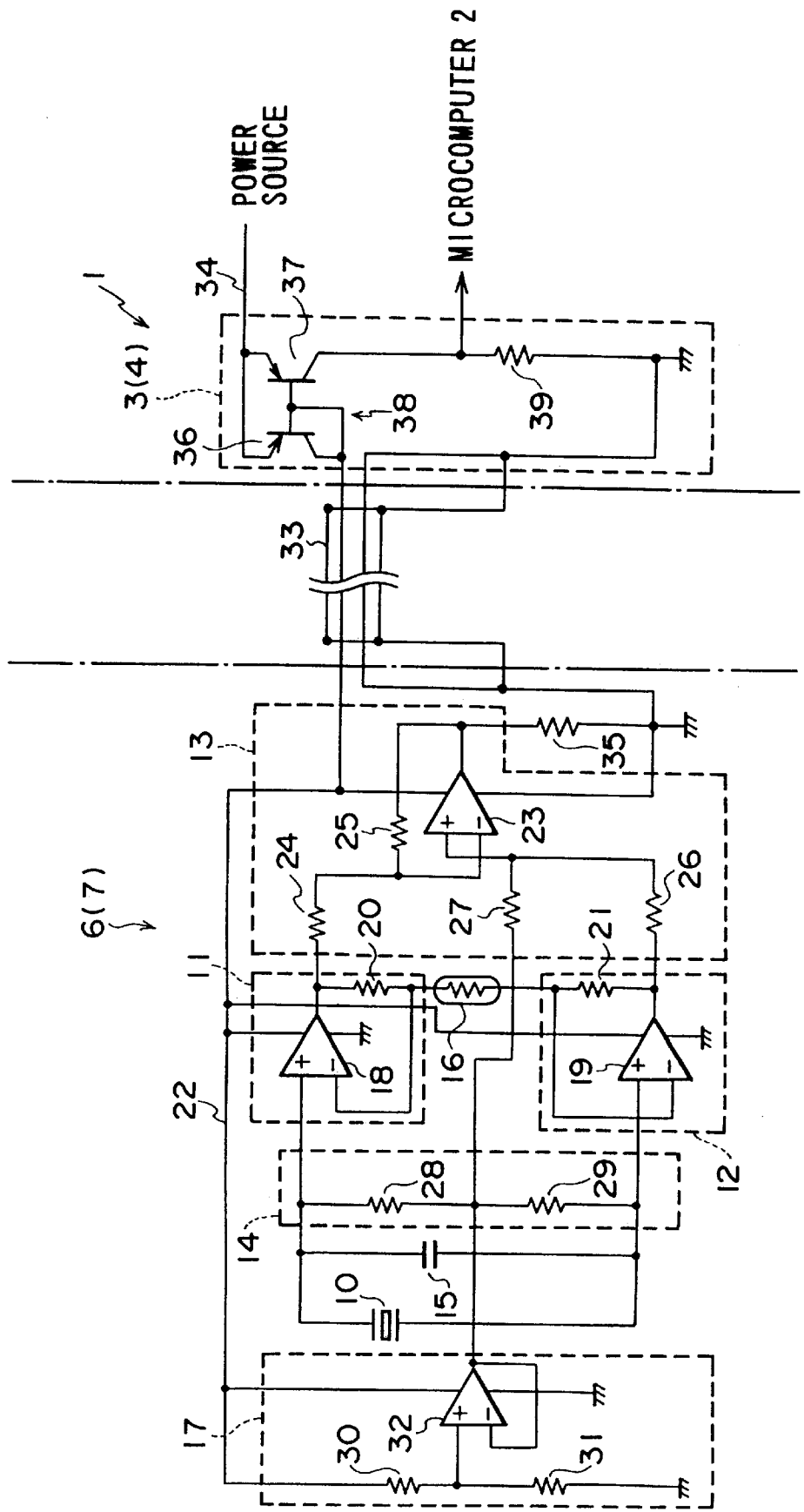
FIG. 2 is a circuit diagram showing an example of first and second front acceleration sensors and first and second receiving circuits in FIG. 1.

FIG. 2 is a circuit diagram showing an example of the front acceleration sensors 6 and 7 and the receiving circuits 3 and 4 of the control unit 1 in FIG. 1.

The first (second) front acceleration sensor 6 (7) includes a piezo-electric element 10 for detecting an acceleration, an amplifier circuit having first and second non-inverting amplifier circuits 11 and 12 and a differential amplifier circuit 13, a bias resistor circuit 14, a condenser 15, a temperature compensation element 16 as temperature compensation means, and a reference voltage circuit 17.

The first non-inverting amplifier circuit 11 of the amplifier circuit has a bipolar transistor type operational amplifier 18 and a resistor 20 inserted between a negative input terminal and an output terminal of the amplifier 18. The second non-inverting amplifier circuit 12 of the amplifier circuit has a bipolar transistor type operational amplifier 19 and a resistor 21 inserted between a negative input terminal and an output terminal of the amplifier 19. An operating power source of the amplifiers 18 and 19 is supplied from a sensor power supply line 22. As described below, the control unit 1 supplies a predetermined constant voltage to the sensor power supply line 22 by way of the receiving circuit 3 (4). A positive input terminal of the amplifier 18 of the first non-inverting amplifier circuit 11 is connected to one end of the piezo-electric element 10, and a positive input terminal of the amplifier 19 of the second non-inverting amplifier circuit 12 is connected to the other end of the piezo-electric element 10. By this, voltage outputs at both ends of the piezo-electric element 10 are non-inversion amplified and converted to low impedances respectively by the first and second non-inverting amplifier circuits 11 and 12. Since the voltage outputs of the piezo-electric element 10 are lowered by a parallel insertion of the condenser 15 to the piezo-electric element 10 as described below, the resistors 20 and 21 of the first and second non-inverting amplifier circuits 11 and 12 are set to relatively high value so that decrement in the voltage outputs of the piezo-electric element 10 can be supplemented by gains of the operational amplifiers 18 and 19.

The differential amplifier circuit 13 of the amplifier circuit has a bipolar transistor type operational amplifier 23. An operating power source of the amplifier 23 is supplied from the sensor power supply line 22. A negative input terminal of the amplifier 23 is connected through a resistor 24 to the output terminal of the amplifier 18 of the first non-inverting amplifier circuit 11, and is also connected through a resistor 25 to an output terminal of the amplifier 23. A positive input terminal of the amplifier 23 is connected through a resistor 26 to the output terminal of the amplifier 19 of the second non-inverting amplifier circuit 12, and also receives a reference potential from the reference voltage circuit 17 through a resistor 27. The differential amplifier circuit 13 differentially amplifies the outputs of the first and second non-inverting amplifier circuits 11 and 12, and outputs an acceleration signal as the sensor output. As described below, the reference potential given from the reference voltage circuit 17 to the differential amplifier circuit 13 is given by way of a reference voltage buffer amplifier 32 so as to match with output impedances of the first and second non-inverting amplifier circuits 11 and 12. By this, a common mode rejection ratio of the differential amplifier circuit 13 becomes large. Accordingly, an influence of offset voltage due to the gain increment of the first and second non-inverting amplifier circuits 11 and 12 is suppressed by the differential amplifier circuit 13.

The bias resistor circuit 14 has a bias resistor 28 inserted between the positive input terminal of the amplifier 18 of the first non-inverting amplifier circuit 11 and the reference potential of the reference voltage circuit 17, and a bias resistor 29 inserted between the positive input terminal of the amplifier 19 of the second non-inverting amplifier circuit 12 and the reference potential of the reference voltage circuit 17. The condenser 15 is inserted in parallel with the piezo-electric element 10 so that a composite capacity with the piezo-electric element 10 increases. By this, a lower cut-off frequency is lowered without increasing resistor values of the bias resistors 28 and 29, and hereby velocity variations due to collision can be detected more easily. From the viewpoint of this, it is desirable to give a frequency even below 10 Hz, for example. If the bias resistors 28 and 29 are set, for example, to high resistance values of about 100 MΩ in order to lower the lower cut-off frequency, it is not possible to use these resistors under a normal atmosphere. Further, if the bias resistor 28 and 29 are set to the high resistance values as mentioned above, a DC voltage may be applied to the piezo-electric element 10 by influence of bias current, and thereby a migration may be caused in the piezo-electric element 10. Because of this, it is desirable to set the bias resistors 28 and 29 to about 1 MΩ. Since the lower cut-off frequency is determined by the composite capacity of the piezo-electric element 10 and the condenser 15 and the resistance values of the bias resistors 28 and 29, a capacity value of the condenser 15 is set so that the bias resistors 28 and 29 are about 1 MΩ, and furthermore, so that the lower cut-off frequency is a low value below 10 Hz, for example. Although the voltage outputs of the piezo-electric element 10 are decreased by the parallel insertion of the condenser 15 to the piezo-electric element 10, this is supplemented by the gain increment of the first and second non-inverting amplifier circuits 11 and 12 as mentioned above. Also, since an output-temperature characteristic of the piezo-electric element 10 becomes apparent by the parallel insertion of the condenser 15, the temperature compensation element 16 is provided in order to compensate the output-temperature characteristic of the piezo-electric element 10. The output-temperature characteristic of the piezo-electric element 10 is a positive characteristic. Therefore, the outputs of the piezo-electric element 10 are increased when temperature rises, and are decreased when temperature drops.

The temperature compensation element 16 is inserted between the negative input terminal of the amplifier 18 of the first non-inverting amplifier circuit 11 and the negative input terminal of the amplifier 19 of the second non-inverting amplifier circuit 12. In this example, the temperature compensation element 16 is a posistor. The posistor 16 lowers the gains of the non-inverting amplifier circuits 11 and 12 when temperature rises, and raises these gains when temperature drops. By this, the outputs of the piezo-electric element 10 is compensated against temperature variations. Since the gains of the first and second non-inverting amplifier circuits 11 and 12 are adjusted by a single temperature compensation element 16, decrement in number of elements and simplification of circuit composition can be achieved.

The reference voltage circuit 17 has a series connection of voltage dividing resistors 30 and 31 inserted between the sensor power supply line 22 and the ground, and the reference voltage buffer amplifier 32 composed of a bipolar transistor type operational amplifier. The buffer amplifier 32 receives a voltage divided by the voltage dividing resistors 30 and 31 as a positive input, and a negative input terminal is connected to its output terminal. The reference voltage circuit 17 gives the reference potential to the differential amplifier circuit 13 and the bias resistor circuit 14 by way of the buffer amplifier 32. Thus, matching with the output impedances of the non-inverting amplifier circuits 11 and 12 can be attained, and thereby the common mode rejection ratio of the differential amplifier circuit 13 is increased. An operating power source of the buffer amplifier 32 is supplied from the sensor power supply line 22. Since the sensor outputs of the front acceleration sensors 6 (7) are transmitted as current variations in the sensor power supply line 22 to the control unit 1 as described below, the voltage dividing resistors 30 and 31 are set to relatively high values of some KΩ so that a current flowing through the resistors 30 and 31 to the ground becomes small. Incidentally, in this example the reference potential is given to the bias resistor circuit 14 by way of the buffer amplifier 32, but it is also acceptable to directly give the divided voltage of the resistors 30 and 31 to the bias resistor circuit 14.

The sensor power supply line 22 of the first (second) front acceleration sensor 6 (7) is connected to the first (second) receiving circuit 3 (4) of the control unit 1 by way of a transmission cable 33, and receives the predetermined constant voltage from a unit power supply line 34 in the control unit 1 by way of the receiving circuit 3 (4). In this example, from the viewpoint of noise prevention, a twisted pair cable is used as the transmission cable 33. The output terminal of the operational amplifier 23 of the differential amplifier circuit 13 which gives the sensor output of the front acceleration sensor 6 (7) is grounded through an output resistor 35, and thereby the sensor output is given as current variations in the sensor power supply line 22 to the receiving circuit 3 (4) by way of the twisted pair cable 33. Incidentally, since the operational amplifiers 18, 19, 23 and 32 in the front acceleration sensor 6 (7) operate with nearly a constant current, the operating current of the amplifiers 18, 19, 23 and 32 does not affect the sensor output given as current variations.

The first (second) receiving circuit 3 (4) of the control unit 1 has a current mirror circuit 38 having a pair of transistors 36 and 37, and a detection resistor 39. One transistor 36 at its emitter is connected to the unit power supply line 34, at its collector is connected to the sensor power supply line 22 by way of the twisted pair cable 33, and at its base is connected to the collector and a base of the other transistor 37. The other transistor 37 at its emitter is connected to the unit power supply line 34, and at its collector is grounded through the detection resistor 39. The sensor output from the front acceleration sensor 6 (7) is given as a voltage signal to the microcomputer 2 by the detection resistor 39.

In the circuit of FIG. 2, when the piezo-electric element 10 does not detect any acceleration, the differential amplifier circuit 13 gives a prescribed voltage output based on the reference potential of the reference voltage circuit 17, and thereby a prescribed current flows through the output resistor 35 to the ground. Accordingly, a certain current corresponding to the prescribed current which flows through the output resistor 35 is given to the unit power supply line 34 of the control unit 1 by way of the sensor power supply line 22 and the twisted pair cable 33. In the receiving circuit 3

(4), the pair of transistors 36 and 37 give a current to the detection resistor 39 based on base-emitter voltages according to the certain current flowing through the unit power supply line 34. Thus, a prescribed voltage signal indicating that no acceleration is detected is given by way of the detection resistor 39 to the microcomputer 2. The microcomputer 2 inputs the prescribed voltage signal by way of A/D conversion.

On the other hand, when the piezo-electric element 10 detects an acceleration, the voltage outputs of the both ends of the piezo-electric element 10 are non-inversion amplified by the first and second non-inverting amplifier circuits 11 and 12, respectively, and the non-inversion amplified outputs are differentially amplified by the differential amplifier circuit 13. By this, the differential amplifier circuit 13 gives a voltage output which varies according to the detected acceleration, and the voltage output is given as current variations to the unit power supply line 34 of the control unit 1 by way of the output resistor 35. In the receiving circuit 3 (4), a base-emitter voltage of one transistor 36 varies according to the current variations in the unit power supply line 34, namely the sensor output of the front acceleration sensor 6 (7). By this, the other transistor 37 gives the detection resistor 39 a collector current so that a base-emitter voltage of the other transistor 37 is the same potential as the base-emitter voltage of one transistor 36. By this, the acceleration signal of the front acceleration sensor 6 (7) is given as a voltage signal by the detection resistor 39, and the microcomputer 2 inputs the voltage signal by way of A/D conversion. If the detection resistor 39 is set to the same resistance value as that of the output resistor 35 of the front acceleration sensor 6 (7), a voltage nearly the same as a voltage at both ends of the output resistor 35 is given from the detection resistor 39.

According to the composition of FIG. 2, the output fluctuations of the piezo-electric element 10 due to variations in ambient temperature are compensated by the gain adjustments of the first and second non-inverting amplifier circuits 11 and 12 by means of the temperature compensation element 16. Because of this, even when the front acceleration sensor 6 (7) is provided in a place with extreme ambient temperature variations such that it directly receives heat from the vehicle engine, the sensor output of the front acceleration sensor 6 (7) does not fluctuate by variations in ambient temperature.

Also, by inserting the condenser 15 in parallel with the piezo-electric element 10, the composite capacity is increased. By this, the lower cut-off frequency can be lowered without increasing the resistance values of the bias resistors 28 and 29. Because of this, the front acceleration sensor 6 (7) can give a lower frequency component, and thereby the sensor output that facilitates a collision decision can be given. Also, it is not necessary to set the bias resistors 28 and 29 to such high resistance values that cannot be used in an ordinary atmosphere. Further, the migration in the piezo-electric element 10, occurring by setting the bias resistors 28 and 29 to high resistance values, can be prevented.

Also, the sensor output of the front acceleration sensor 6 (7) is transmitted to the receiving circuit 3 (4) of the control unit 1 as current variations in the power supply lines 22, 33 and 34. Because of this, it is not necessary to provide a signal line. Also, since it is not necessary to use a ground potential by car body grounding as a reference, noise prevention can be done more effectively.

Further, the receiving circuit 3 (4) of the control unit 1 is formed with the current mirror circuit 38 comprising the transistors 36 and 37. Because of this, since temperature characteristics of the base-emitter voltages of the transistors 36 and 37 are cancelled, no temperature compensation means is required. Also, since the receiving circuit 3 (4) operates with a voltage supplied to the front acceleration sensor 6 (7), there is no need to prepare another operating voltage, and the composition of the receiving circuit 3 (4) can be simplified in the extreme.

Reverting to FIG. 1, the room acceleration sensor 8 is provided on the floor tunnel in the car room together with the control unit 1. The room acceleration sensor 8 detects an acceleration transmitted through the floor tunnel, and gives an acceleration signal representative thereof to the microcomputer 2 as the sensor output. Since the room acceleration sensor 8 is provided on the floor tunnel in the car room, in case of a collision in which a collision acceleration transmitted to the floor tunnel is weakened because of an impact absorption by a crush of the car body, there is a fear that the collision acceleration detected by the room acceleration sensor 8 is small. However, in case of a collision, such as a head-on collision, in which the collision acceleration is easily transmitted to the floor tunnel, the collision acceleration can be detected early by the room acceleration sensor 8. As the room acceleration sensor 8, a well-known acceleration sensor can be used, or an acceleration sensor which is composed likewise the front acceleration sensor of FIG. 2 can be used.

The microcomputer 2 of the control unit 1 executes the following controls according to flow diagrams of FIG. 4, FIG. 5, FIG. 6 and FIG. 7 described below. When the vehicle is under a collision, the microcomputer 2 detects variational quantities $\Delta Vf1dif$ and $\Delta Vf2dif$ of integrated values $\Delta Vf1$ and $\Delta Vf2$ of acceleration signals Gf1 and Gf2 of the first and second front acceleration sensors 6 and 7. The variational quantities $\Delta Vf1dif$ and $\Delta Vf2dif$, as described below, are detected based on integrated values $\Delta Vf1t1$ and $\Delta Vf2t1$ of the acceleration signals Gf1 and Gf2 at a first time point t1 and integrated values $\Delta Vf1t2$ and $\Delta Vf2t2$ of the acceleration signals Gf1 and Gf2 at a second time point t2. When at least one of the variational quantities $\Delta Vf1dif$ and $\Delta Vf2dif$ based on the first and second front acceleration sensors 6 and 7 is larger than a predetermined value $\Delta Vthdif$, the microcomputer 2 increases an integrated value $\Delta Vt$ of an acceleration signal Gt of the room acceleration sensor 8 by adding a predetermined addition value $\Delta Vadd$ to the integrated value $\Delta Vt$. Then, when an increased value $\Delta Vt+\Delta Vadd$ exceeds a threshold value $\Delta Vt$, the microcomputer 2 provides the collision detection signal to the drive circuit 5. In this embodiment, the threshold value Vth is a predetermined value. If both the variational quantities $\Delta Vf1dif$ and $\Delta Vf2dif$ are smaller than the predetermined value $\Delta Vthdif$, the microcomputer 2 decides whether the integrated value $\Delta Vt$ of the acceleration signal Gt of the room acceleration sensor 8 is larger than the threshold value Vth. Then, when the integrated value $\Delta Vt$ is larger than the threshold value Vth, the microcomputer 2 provides the collision detection signal to the drive circuit 5.

Figure 3:
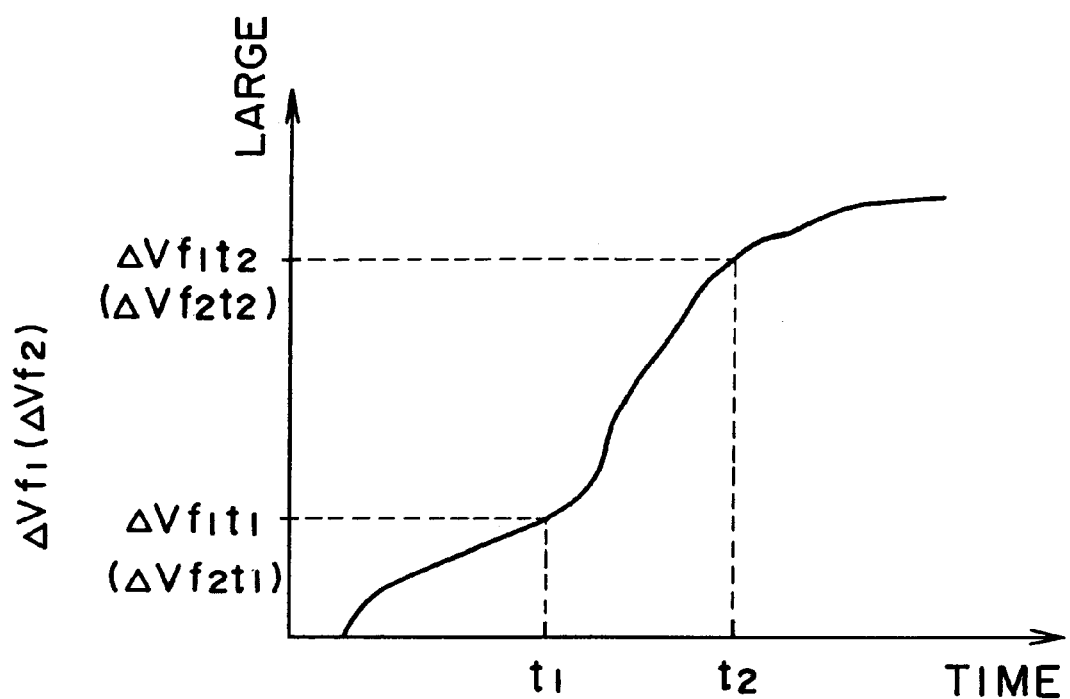
FIG. 3 is an explanatory drawing for explaining a detection of a variational quantity in the first embodiment of FIG. 1.

FIG. 3 is an explanatory drawing for explaining a detection of the variational quantity $\Delta Vf1dif$ ($\Delta Vf2dif$) in the first embodiment. When a vehicle collision occurs, the integrated value $\Delta Vf1$ ($\Delta Vf2$) of the acceleration signal Gf1 (Gf2) of the front acceleration sensor 6 (7) increases as shown in FIG. 3. At the predetermined first time point t1 after a start of the collision, the integrated value $\Delta Vf1$ ($\Delta Vf2$) of the front acceleration sensor 6 (7) is detected as the integrated value $\Delta Vf1t1$ ($\Delta Vf2t1$) of the first time point t1. Then, at the second time point t2 after lapse of a predetermined time from the first time point t1, the integrated value ΔVf1 (ΔVf2) is detected as the integrated value ΔVf1t1 (ΔVf2t2) of the second time point t2. A difference ΔVf1t2−ΔVf1t1 (ΔVf2t2−ΔVf2t1) between the integrated value ΔVf1t2 (ΔVf2t2) of the second time point t2 and the integrated value ΔVf1t1 (ΔVf2t1) of the first time point t1 is computed, and thereby the variational quantity ΔVf1dif=ΔVf1t2−ΔVf1t1 (ΔVf2dif=ΔVf2t2−ΔVf2t1) is given. The first and second time points t1 and t2 are set so that a part of large variations in the integrated value ΔVf1 (ΔVf2) of the front acceleration sensor 6 (7) can be detected at an early stage of collision.

Figure 4:
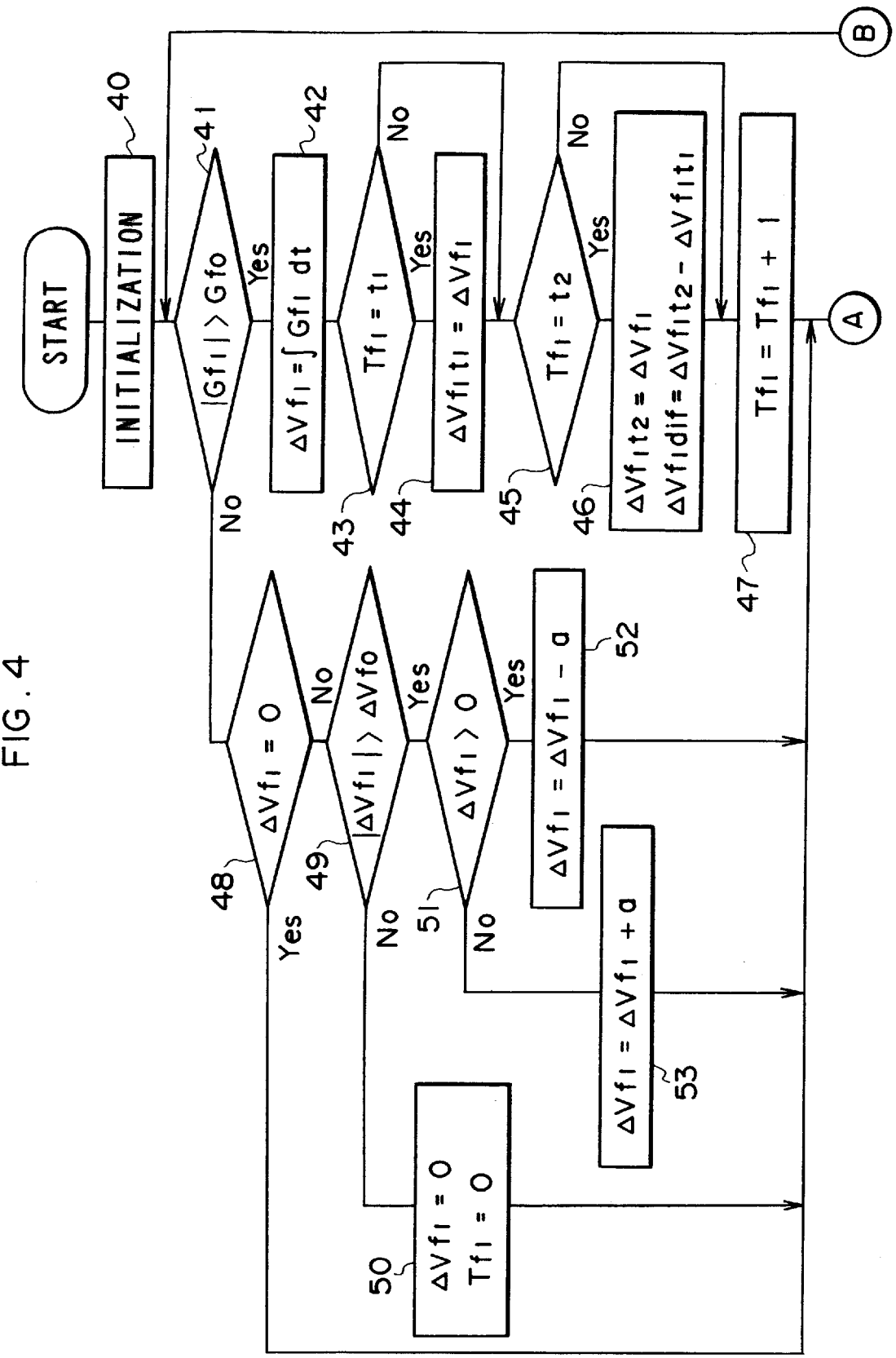
FIG. 4, FIG. 5, FIG. 6 and FIG. 7 are flow diagrams of a microcomputer of FIG. 1.
Figure 5:
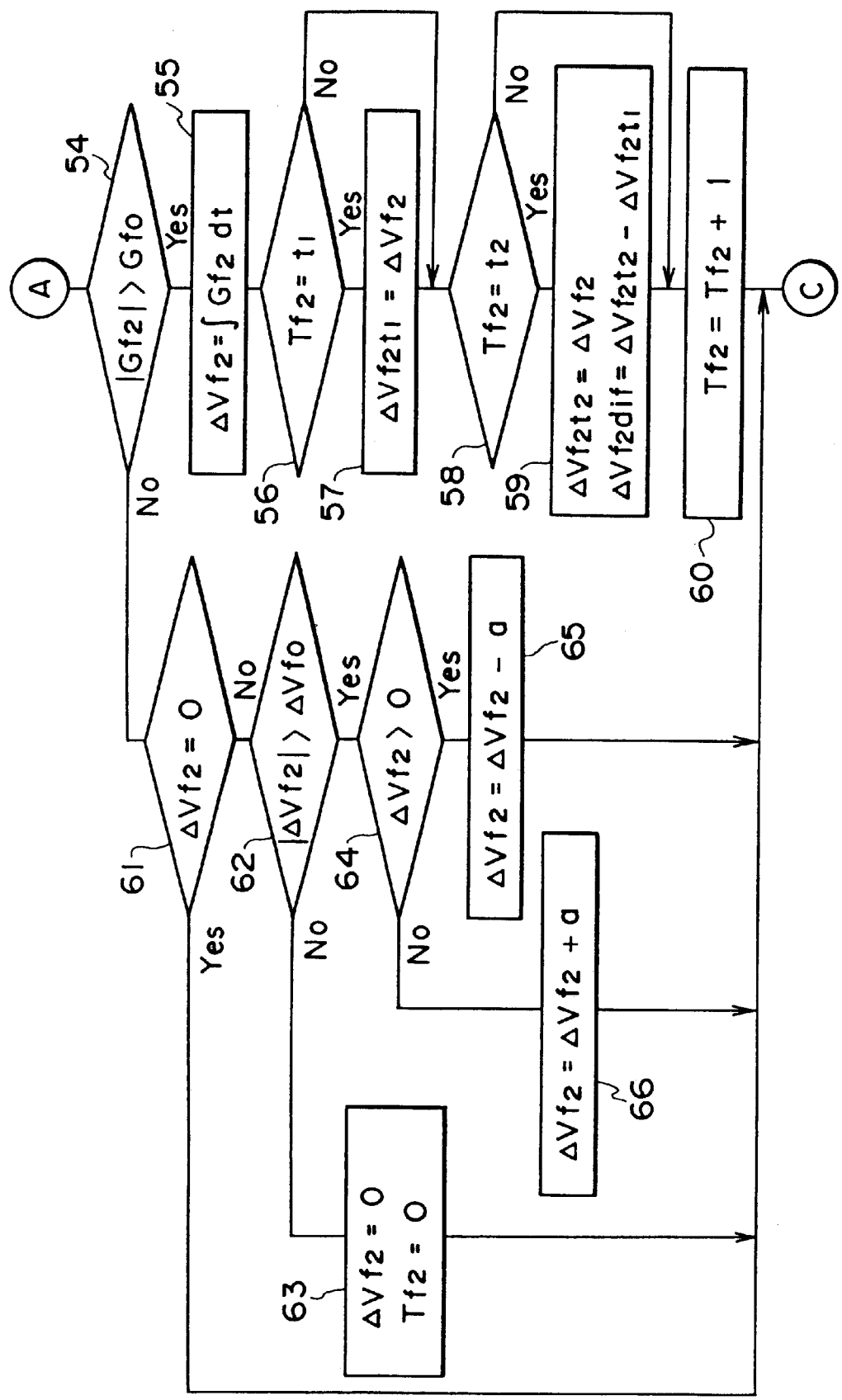
Figure 6:
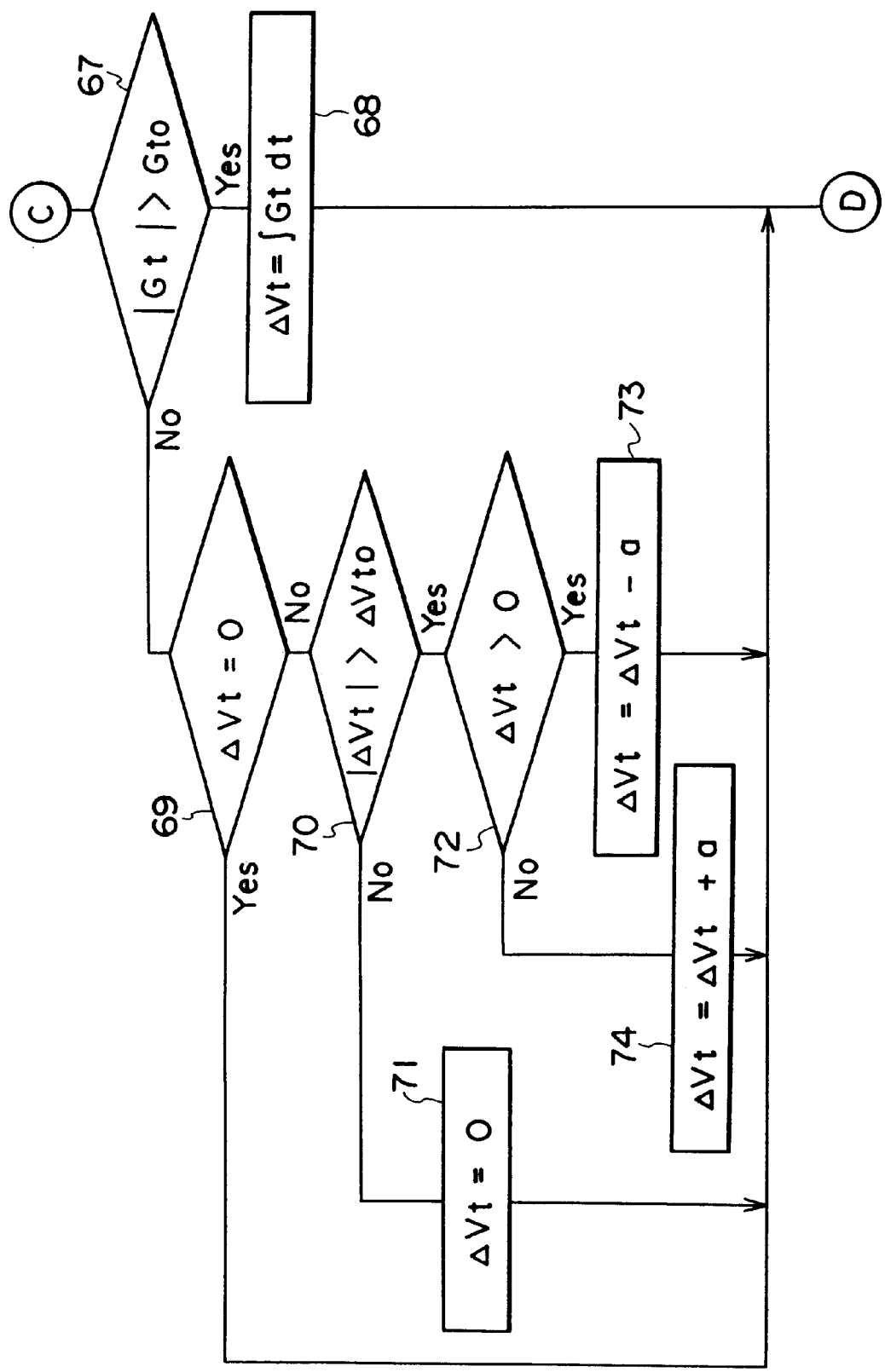
Figure 7:
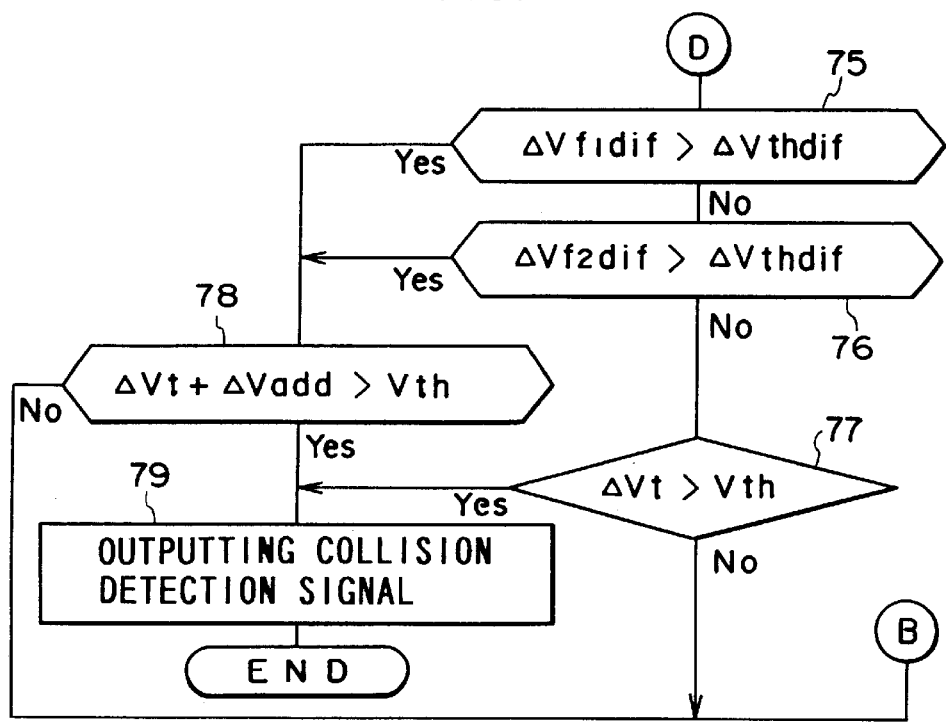

FIG. 4, FIG. 5, FIG. 6 and FIG. 7 are flow diagrams of the microcomputer 2 in FIG. 1. A terminal A of FIG. 5 is connected to a terminal having the same sign A of FIG. 4, a terminal C of the FIG. 6 is connected to a terminal having the same sign C of FIG. 5, and terminals B and D of the FIG. 7 are connected to terminals having the same signs B and D of FIG. 4 and FIG. 6.

When a power source is applied by turning on an ignition switch (not shown in the drawings) of the vehicle, the microcomputer 2 starts the control processing according to the flow diagrams of FIGS. 4–7, and enters a step 41 after an initialization of a step 40.

In the step 41, the microcomputer 2 inputs the acceleration signal Gf1 of the first front acceleration sensor 6, and decides whether an absolute value of the acceleration signal Gf1 is larger than a front reference value Gfo. The front reference value Gfo is a reference value for deciding whether to integrate the acceleration signal Gf1 and the acceleration signal Gf2. The acceleration signal Gf2 is the sensor output of the second front acceleration sensor 7. The front reference value Gfo is set so that an integration of the acceleration signals Gf1 and Gf2 is not performed against a non-collision acceleration of the vehicle occurring by a sudden braking and so on.

When the absolute value of the acceleration signal Gf1 is larger than the reference value Gfo in the step 41, the microcomputer 2 recognizes that the acceleration signal Gf1 is a collision acceleration signal caused by a collision, and computes the integrated value ΔVf1 of the acceleration signal Gf1 in a step 42. Then, in steps 43–46, the microcomputer 2 detects the variational quantity ΔVf1dif of the integrated value ΔVf1 of the acceleration signal Gf1 of the first front acceleration sensor 6. In the step 43, whether the contents of a first soft-timer Tf1 is the first time point t1 is decided. The first soft-timer Tf1 is reset to "0" in the initialization of the step 40 and a step 50 in a reset processing, and is increased by +1 in a step 50. By this, the first soft-timer Tf1 is designed to count the time elapsed from the reset state of "0" when a collision has been recognized based on the first front acceleration sensor 6. If the first soft-timer Tf1 is the first time point t1 in the step 43, the microcomputer 2 enters a step 44, stores the integrated value ΔVf1 of the first front acceleration sensor 6 at this time as the integrated value ΔVf1t1 of the first time point t1, and then enters a following step 45. If the first soft-timer Tf1 is not the first time point t1 in the step 43, the microcomputer 2 directly enters the step 45 without entering the step 44. In the step 45, whether the contents of the first soft-timer Tf1 is the second time point t2 after lapse of the predetermined time from the first time point t1 is decided. If the first soft-timer Tf1 is the second time point t2, the microcomputer 2 enters a step 46, and stores the integrated value ΔVf1 of the first front acceleration sensor 6 at this time as the integrated value ΔVf1t2 of the second time point t2. Then, the microcomputer 2 detects the variational quantity ΔVf1dif of the integrated value ΔVf1 of the first front acceleration sensor 6 by subtracting the integrated value ΔVf1t1 of the first time point t1 from the integrated value ΔVf1t2 of the second time point t2, and enters a following step 47. If the first soft-timer Tf1 is not the second time point t2 in the step 45, the microcomputer 2 directly enters the step 47 without entering the step 46. In the step 47, the first soft-timer Tf1 is increased by +1. Thereafter, the microcomputer 2 enters a step 54 of FIG. 5.

On the other hand, in the step 41, if the absolute value of the acceleration signal Gf1 of the first front acceleration sensor 6 is smaller than the front reference value Gfo, the microcomputer 2 enters a reset processing of steps 48–53, and goes to the step 54 of FIG. 5 after the reset processing. In the step 48 of the reset processing, whether the integrated value ΔVf1 is "0" is decided. If the absolute value of the acceleration signal Gf1 has not exceeded the front reference value Gfo yet after starting the control processing, the integrated value ΔVf1 is the initial value namely "0". Accordingly, the microcomputer 2 directly enters from the step 48 to the step 54 of FIG. 5. When the integrated value ΔVf1 is not "0", the microcomputer 2 enters from the step 48 to the step 49, and decides whether the absolute value of the integrated value ΔVf1 is larger than a front reset reference value ΔVfo. The front reset reference value ΔVfo is a reference value for deciding whether to reset the integrated value ΔVf1 of the first front acceleration sensor 6 and the integrated value ΔVf2 of the second front acceleration sensor 7 to "0". In this embodiment, the front reset reference value ΔVfo is set as a<ΔVfo<2a. "a" is a decrement value described below. When the absolute value of the integrated value ΔVf1 is smaller than the reference value ΔVfo, the microcomputer 2 enters from the step 49 to the step 50, resets the integrated value ΔVf1 and the first soft-timer Tf1 to "0", and enters the step 54 of FIG. 5. When the absolute value of the integrated value ΔVf1 is larger than the reference value ΔVfo, the microcomputer 2 enters from the step 49 to the step 51, and decides whether the integrated value ΔVf1 is larger than "0". When the integrated value ΔVf1 is larger than "0", the decrement value "a" is subtracted from the integrated value ΔVf1 in the step 52. When the integrated value ΔVf1 is smaller than "0", the decrement value "a" is added to the integrated value ΔVf1 in the step 53. Thereafter, the microcomputer 2 enters the step 54 of FIG. 5.

Since the acceleration signals Gf1 and Gf2 of the first and second front acceleration sensors 6 and 7 fluctuate by resonance and so on, the acceleration signals Gf1 and Gf2 may temporally become smaller than the front reference value Gfo after they becoming larger than the value Gfo while detecting a collision acceleration. In such a case, in this embodiment, a prior integrated value is not immediately reset to "0", but it is processed gradually toward the rest direction by means of the decrement value "a". Because of this, when the acceleration signals Gf1 and Gf2 exceed the front reference value Gfo again, the integral processing can be continued from the prior integrated value, and thereby a collision detection can be performed quickly. Incidentally, the integrated value ΔVf1 becomes smaller than "0" in the step 51 when the vehicle is collided from behind, for example. In such a case, the integrated value ΔVf1 becomes a negative value. Since an integrated value in such a case is processed toward the reset direction by the step 53, a continuance of an unstable signal is prevented.

In the step 54 of FIG. 5, the microcomputer 2 inputs the acceleration signal Gf2 of the second front acceleration sensor 7, and decides whether an absolute value of the acceleration signal Gf2 is larger than the front reference value Gfo. If the absolute value of the acceleration signal Gf2 is larger than the reference value Gfo, the microcomputer 2 recognizes that the acceleration signal Gf2 is a collision acceleration signal caused by the collision, and computes the integrated value $\Delta$Vf2 of the acceleration signal Gf2 in a step 55. Then, in steps 56–59, the microcomputer 2 detects the variational quantity $\Delta$Vf2*dif* of the integrated value $\Delta$Vf2 of the acceleration signal Gf2 of the second front acceleration sensor 7. In the step 56, whether the contents of a second soft-timer Tf2 is the first time point t1 is decided. The second soft-timer Tf2 is reset to "0" in the initialization of the step 40 and a step 63 in a reset processing, and is increased by +1 in a step 60. By this, the second soft-timer Tf2 is designed to count the time elapsed from the reset state of "0" when a collision has been recognized based on the second front acceleration sensor 7. If the second soft-timer Tf2 is the first time point t1 in the step 56, the microcomputer 2 enters a step 57, stores the integrated value $\Delta$Vf2 of the second front acceleration sensor 7 at this time as the integrated value $\Delta$Vf2*t*1 of the first time point t1, and then enters a following step 58. If the second soft-timer Tf2 is not the first time point t1 in the step 56, the microcomputer 2 directly enters the step 58 without entering the step 57. In the step 58, whether the contents of the second soft-timer Tf2 is the second time point t2 is decided. If the second soft-timer Tf2 is the second time point t2, the microcomputer 2 enters a step 59, and stores the integrated value $\Delta$Vf2 of the second front acceleration sensor 7 at this time as the integrated value $\Delta$Vf2*t*2 of the second time point t2. Then, the microcomputer 2 detects the variational quantity $\Delta$Vf2*dif* of the integrated value $\Delta$Vf2 of the second front acceleration sensor 7 by subtracting the integrated value $\Delta$Vf2*t*1 of the first time point t1 from the integrated value $\Delta$Vf2*t*2 of the second time point t2, and enters a following step 60. If the second soft-timer Tf2 is not the second time point t2 in the step 58, the microcomputer 2 directly enters the step 60 without entering the step 59. In the step 60, the second soft-timer Tf2 is increased by +1. Thereafter, the microcomputer 2 enters a step 67 of FIG. 6.

On the other hand, in the step 54, if the absolute value of the acceleration signal Gf2 of the second front acceleration sensor 7 is smaller than the front reference value Gfo, the microcomputer 2 enters a reset processing of steps 61–66, and goes to the step 67 of FIG. 6 after the reset processing. In the reset processing of the steps 61–66, the same processing as the aforementioned reset processing of the steps 48–53 of FIG. 4 is executed in respect to the integrated value $\Delta$Vf2 of the second front acceleration sensor 7 and the second soft-timer Tf2.

In the step 67 of FIG. 6, the microcomputer 2 inputs the acceleration signal Gt of the room acceleration sensor 8, and decides whether the absolute value of the acceleration signal Gt is larger than a room reference value Gto. The room reference value Gto is a reference value for deciding whether to integrate the acceleration signal Gt. The room reference value Gto is set so that an integration of the acceleration signal Gt is not performed against a non-collision acceleration of the vehicle occurring by a sudden braking and so on. In the step 67, if the absolute value of the acceleration signal Gt is larger than the reference value Gto, the microcomputer 2 computes the integrated value $\Delta$Vt of the acceleration signal Gt in the step 68, and then enters a step 75 of FIG. 7.

On the other hand, in the step 67, if the absolute value of the acceleration signal Gt is smaller than the room reference value Gto, the microcomputer 2 enters a reset processing of steps 69–74, and goes to the step 75 of FIG. 7 after the reset processing. In the reset processing of the steps 69–74, the same processing as the aforementioned reset processing of the steps 48–53 of FIG. 4 is executed in respect to the integrated value $\Delta$Vt of the room acceleration sensor 8. A room reset reference value $\Delta$Vto of the step 70 is a reference value for deciding whether to reset the integrated value $\Delta$Vt of the room acceleration sensor 8 to "0", and this is set likewise the aforementioned front reset reference value $\Delta$Vfo.

In the step 75 of FIG. 7, the microcomputer 2 decides whether the variational quantity $\Delta$Vf1*dif* of the integrated value $\Delta$Vf1 of the first front acceleration sensor 6 is larger than the predetermined value $\Delta$Vthdif. If the variational quantity $\Delta$Vf1*dif* is smaller th an the predetermined value $\Delta$Vthdif, the microcomputer 2 enters a step 76, and decides whether the variational quantity $\Delta$Vf2*dif* of the integrated value $\Delta$Vf2 of the second front acceleration sensor 7 is larger than the predetermined value $\Delta$Vthdif. If the variational quantity $\Delta$Vf2*dif* is smaller than the predetermined value $\Delta$Vthdif, that is, if both the variational quantities $\Delta$Vf1*dif* and $\Delta$Vf2*dif* are smaller than the predetermined value $\Delta$Vthdif, the microcomputer 2 enters a step 77, and decides whether the integrated value $\Delta$Vt of the room acceleration sensor 8 is larger than the threshold value Vth. If the integrated value $\Delta$Vt is smaller than the threshold value Vth in the step 77, the microcomputer 2 returns to the step 41 of FIG. 4, and the aforementioned control processing is repeated. The threshold value Vth is a threshold value for deciding whether the vehicle is in a collision requiring to drive the occupant protection device 9, and is set experimentally based on a collision requiring the drive of the occupant protection device 9 and a collision not requiring its drive.

In a non-collision namely an ordinary state, the variational quantities $\Delta$Vf1*dif* and $\Delta$Vf2*dif* of the first and second front acceleration sensors 6 and 7 remain at the initial value namely "0". Therefore, in this case, the microcomputer 2 returns to the step 41 of FIG. 4 through the steps 75, 76 and 77. Also, in a state that the first and second time points t1 and t2 do not elapse after starting of a collision, the variational quantities $\Delta$Vf1*dif* and $\Delta$Vf2*dif* are "0". In this case, if the integrated value $\Delta$Vt of the room acceleration sensor 8 is below the threshold value Vth, the microcomputer 2 returns to the step 41 of FIG. 4 through the steps 75, 76 and 77. In case in which the vehicle is collided from behind, since the variational quantities $\Delta$Vf1*dif* and $\Delta$Vf2*dif* and the integrated value $\Delta$Vt of the room acceleration sensor 8 become negative values, the microcomputer 2 returns to the step 41 of FIG. 4 through the steps 75, 76 and 77. Integrated values in such a case are processed gradually toward the reset direction by reset processing.

On the other hand, if the variational quantity $\Delta$Vf1*dif* of the first front acceleration sensor 6 is larger than the predetermined value $\Delta$Vthdif in the step 75, the microcomputer 2 enters a step 78. Also, if the variational quantity $\Delta$Vf2*dif* of the second front acceleration sensor 7 is larger than the predetermined value $\Delta$Vthdif in the step 76, the microcomputer 2 enters the step 78. In the step 78, the microcomputer 2 increases the integrated value $\Delta$Vt of the room acceleration sensor 8 by adding the predetermined addition value $\Delta$Vadd to the integrated value $\Delta$Vt, and decides whether the increased value $\Delta$Vt+$\Delta$Vadd is larger than the threshold value Vth. If the increased value $\Delta$Vt+$\Delta$Vadd is smaller than the threshold value Vth, the microcomputer 2 returns to the step 41 of FIG. 4. If the increased value $\Delta$Vt+$\Delta$Vadd exceeds the threshold value Vth, the microcomputer 2 enters from the step 78 to a step 79. Also, if the integrated value $\Delta$Vt of the room acceleration sensor 8 exceeds the threshold value Vth in the aforementioned step 77, the microcomputer 2 enters from the step 77 to the step 79. In the step 79, the microcomputer 2 outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 such as an airbag is driven.

The first and second front acceleration sensors 6 and 7, as described above, are provided at the front part of the vehicle. Hence, even in case of a collision, such as an oblique or offset collision, in which a collision acceleration transmitted to the room acceleration sensor 8 provided on the floor tunnel may be weakened, the first and second front acceleration sensors 6 and 7 detect the collision acceleration early and give the acceleration signals Gf1 and Gf2 to the control unit 1. By this, since the control unit 1 increases the integrated value $\Delta Vt$ of the room acceleration sensor 8 based on the variational quantity $\Delta Vf1dif$ or $\Delta Vf2dif$, the collision detection signal is given to the drive circuit 5 without causing delay in collision decision. Also, in the first embodiment, when the integrated value $\Delta Vt$ of the room acceleration sensor 8 exceeds the threshold value Vth at the step 77, even if the variational quantities $\Delta Vf1dif$ and $\Delta Vf2dif$ do not exceed the predetermined value $\Delta Vthdif$, the collision detection signal is provided to the drive circuit 5. Hence, in case of a collision, such as a head-on collision against a concrete wall, in which a collision acceleration is easily transmitted to the floor tunnel, it is possible to give the collision detection signal to the drive circuit 5 at an early stage based on the integrated value $\Delta Vt$ itself of the room acceleration sensor 8.

Figure 8:
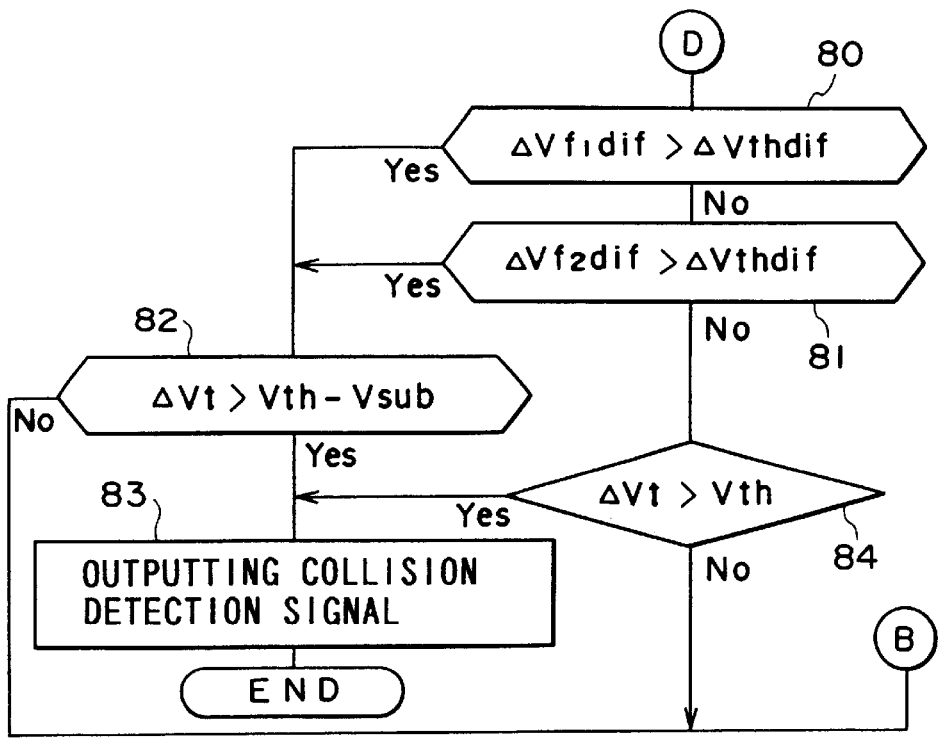
FIG. 8 is a flow diagram of the microcomputer of FIG. 1 showing a second embodiment of the present invention, and constitutes the flow diagrams of the microcomputer together with FIG. 4, FIG. 5 and FIG. 6.

FIG. 8 is a flow diagram of the microcomputer 2 of FIG. 1 showing a second embodiment. FIG. 8 is applied to the flow diagrams of FIG. 4, FIG. 5 and FIG. 6 in place of the flow diagram of FIG. 7. Terminals B and D of FIG. 8 are connected to terminals having the same signs B and D of FIG. 4 and FIG. 6. That is, FIG. 8 constitutes the flow diagrams of the microcomputer 2 together with FIG. 4, FIG. 5 and FIG. 6.

In the second embodiment, when any of the variational quantities $\Delta Vf1dif$ and $\Delta Vf2dif$ of the first and second front acceleration sensors 6 and 7 is above the predetermined value $\Delta Vthdif$, a threshold value Vth toward the integrated value $\Delta Vt$ of the room acceleration sensor 8 is decreased.

The microcomputer 2 enters from the flow diagram of FIG. 6 to a step 80 of FIG. 8. The microcomputer 2 enters a step 82 if the variational quantity $\Delta Vf1dif$ of the first front acceleration sensor 6 is larger than the predetermined value $\Delta Vthdif$ in the step 80, and also enters the step 82 if the variational quantity $\Delta Vf2dif$ of the second front acceleration sensor 7 is larger than the predetermined value $\Delta Vthdif$ in a step 81. In the step 82, the microcomputer 2 decreases the threshold value Vth by subtracting a predetermined subtraction value Vsub from the threshold value Vth, and decides whether the integrated value $\Delta Vt$ of the room acceleration sensor 8 is larger than a decreased threshold value Vth–Vsub. If the integrated value $\Delta Vt$ is smaller than the decreased threshold value Vth–Vsub, the microcomputer 2 returns to the step 41 of FIG. 4. If the integrated value $\Delta Vt$ exceeds the decreased threshold value Vth–Vsub, the microcomputer 2 enters from the step 82 to a step 83, outputs the collision detection signal to the drive circuit 5, and finishes the control processing.

When both the variational quantities $\Delta Vf1dif$ and $\Delta Vf2dif$ of the front acceleration sensors 6 and 7 are smaller than the predetermined value $\Delta Vthdif$ in the steps 80 and 81, the microcomputer 2, as described in FIG. 7, decides in a step 84 whether the integrated value $\Delta Vt$ of the room acceleration sensor 8 exceeds the threshold value Vth. The microcomputer 2 enters the step 83 if the integrated value $\Delta Vt$ is larger than the threshold value Vth, and returns to the step 41 of FIG. 4 if the integrated value $\Delta Vt$ is smaller than the threshold value Vth.

According to the second embodiment, since the threshold value Vth is reduced in place of the increment of the integrated value $\Delta Vt$ of the room acceleration sensor 8, it is possible to give the collision detection signal to the drive circuit 5 without causing delay in collision decision, similarly to the first embodiment.

Figure 9:
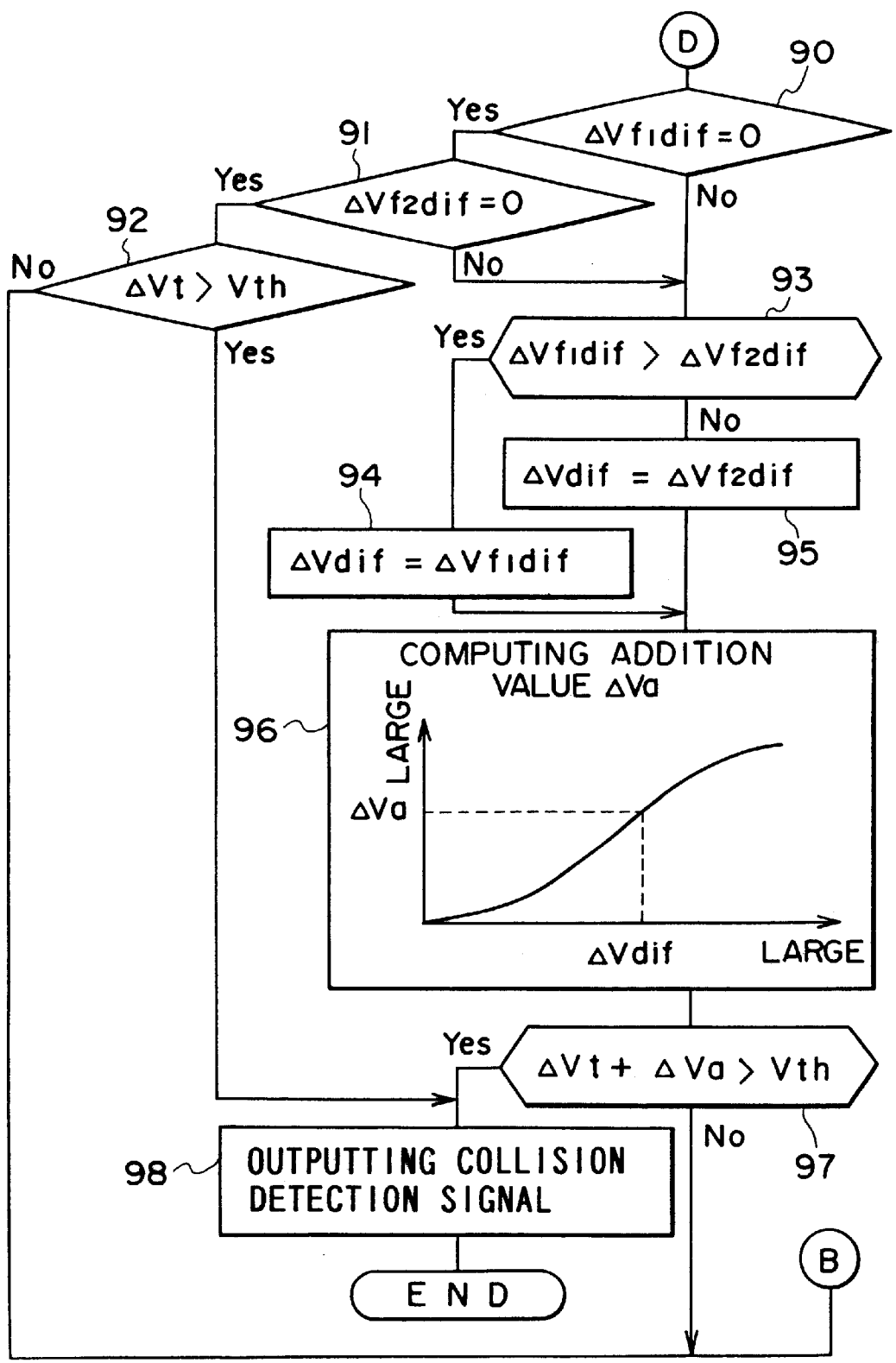
FIG. 9 is a flow diagram of the microcomputer of FIG. 1 showing a third embodiment of the present invention, and constitutes the flow diagrams of the microcomputer together with FIG. 4, FIG. 5 and FIG. 6.

FIG. 9 is a flow diagram of the microcomputer 2 of FIG. 1 showing a third embodiment. FIG. 9 is applied to the flow diagrams of FIG. 4, FIG. 5 and FIG. 6 in place of the flow diagram of FIG. 7. Terminals B and D of FIG. 9 are connected to terminals having the same signs B and D of FIG. 4 and FIG. 6. That is, FIG. 9 constitutes the flow diagrams of the microcomputer 2 together with FIG. 4, FIG. 5 and FIG. 6.

In the third embodiment, a large value out of the variational quantities $\Delta Vf1dif$ and $\Delta Vf2dif$ of the first and second front acceleration sensors 6 and 7 is selected as a variational quantity $\Delta Vdif$, and an addition value $\Delta Va$ corresponding to the variational quantity $\Delta Vdif$ is computed based on a conversion map. The conversion map represents a relationship between the variational quantity $\Delta Vdif$ and the addition value $\Delta Va$ added to the integrated value $\Delta Vt$ of the room acceleration sensor 8. Then, the addition value $\Delta Va$ computed based on the conversion map is added to the integrated value $\Delta Vt$ of the room acceleration sensor 8.

The microcomputer 2 enters from the flow diagram of FIG. 6 to a step 90 of FIG. 9. If both the variational quantities $\Delta Vf1dif$ and $\Delta Vf2dif$ of the first and second front acceleration sensors 6 and 7 are the initial value namely "0", the microcomputer 2 enters a step 92 through the step 90 and a step 91, and decides whether the integrated value $\Delta Vt$ of the room acceleration sensor 8 is larger than the threshold value Vth. If the integrated value $\Delta Vt$ is smaller than the threshold value Vth, the microcomputer 2 returns to the step 41 of FIG. 4.

If at least one of the variational quantities $\Delta Vf1dif$ and $\Delta Vf2dif$ of the front acceleration sensors 6 and 7 is not "0", the microcomputer 2 enters from the step 90 or the step 91 to a step 93, and makes a comparison between the variational quantity $\Delta Vf1dif$ of the first front acceleration sensor 6 and the variational quantity $\Delta Vf2dif$ of the second front acceleration sensor 7. If the variational quantity $\Delta Vf1dif$ of the sensor 6 is larger than the variational quantity $\Delta Vf2dif$ of the sensor 7, the microcomputer 2 enters a step 94, selects the variational quantity $\Delta Vf1dif$ of the sensor 6 as the variational quantity $\Delta Vdif$, and then enters a step 96. If the variational quantity $\Delta Vf2dif$ of the sensor 7 is larger than the variational quantity $\Delta Vf1dif$ of the sensor 6, the microcomputer 2 enters a step 95, selects the variational quantity $\Delta Vf2dif$ of the sensor 7 as the variational quantity $\Delta Vdif$, and then enters the step 96. In the step 96, the microcomputer 2 computes the addition value $\Delta Va$ corresponding to the variational quantity $\Delta Vdif$ based on the conversion map representative of the relationship between the variational quantity $\Delta Vdif$ and the addition value $\Delta Va$. The addition value $\Delta Va$ is small when the variational quantity $\Delta Vdif$ is small, and it becomes larger according as the variational quantity $\Delta Vdif$ becomes larger. Thereafter, in a step 97, the microcomputer 2 increases the integrated value $\Delta Vt$ of the room acceleration sensor 8 by adding the addition value $\Delta Va$ computed at the step 96 to the integrated value $\Delta Vt$, and decides whether an increased value $\Delta Vt+\Delta Va$ is larger than the threshold value Vth. If the increased value $\Delta Vt+\Delta Va$ is smaller than the threshold value Vth, the microcomputer 2 returns to the step 41 of FIG. 4. If the increased value $\Delta Vt+\Delta Va$ exceeds the threshold value Vth, the microcomputer 2 enters from the step 97 to a step 98, outputs the collision detection signal to the drive circuit 5, and finishes the control processing.

In the step 92, if the integrated value $\Delta Vt$ of the room acceleration sensor 8 becomes above the threshold value Vth, the microcomputer 2 enters the step 98 and outputs the collision detection signal to the drive circuit 5. By this, in case of a collision in which a collision acceleration is easily transmitted to the floor tunnel, it is possible to give the collision detection signal to the drive circuit 5 at an early stage based on the integrated value $\Delta Vt$ itself of the room acceleration sensor 8.

According to the third embodiment, since the integrated value $\Delta Vt$ of the room acceleration sensor 8 is increased by the addition value $\Delta Va$, it is possible to give the collision detection signal to the drive circuit 5 without causing delay in collision decision, similarly to the first embodiment. Further, the addition value $\Delta Va$ is given according to magnitude of the variational quantity $\Delta Vdif$. That is, in a big collision, the addition value $\Delta Va$ becomes larger because the variational quantity $\Delta Vdif$ becomes a large value. In a small collision, the addition value $\Delta Va$ becomes smaller because the variational quantity $\Delta Vdif$ becomes a small value. By this, since it is possible to give the addition value $\Delta Va$ according to an extent of collision, the occupant protection device 9 can be controlled more exactly.

In this embodiment, the conversion map of the step 96, when the variational quantity $\Delta Vdif$ is a negative value, gives "0" as the addition value $\Delta Va$. Therefore, when the vehicle is collided from behind, the addition value $\Delta Va$ becomes "0", and the integrated value $\Delta Vt$ of the room acceleration sensor 8 becomes a negative value. Because of this, the microcomputer 2 returns from the step 97 to the step 41 of FIG. 4, and the integrated value $\Delta Vt$ is processed gradually toward the reset direction by the aforementioned reset processing.

Figure 10:
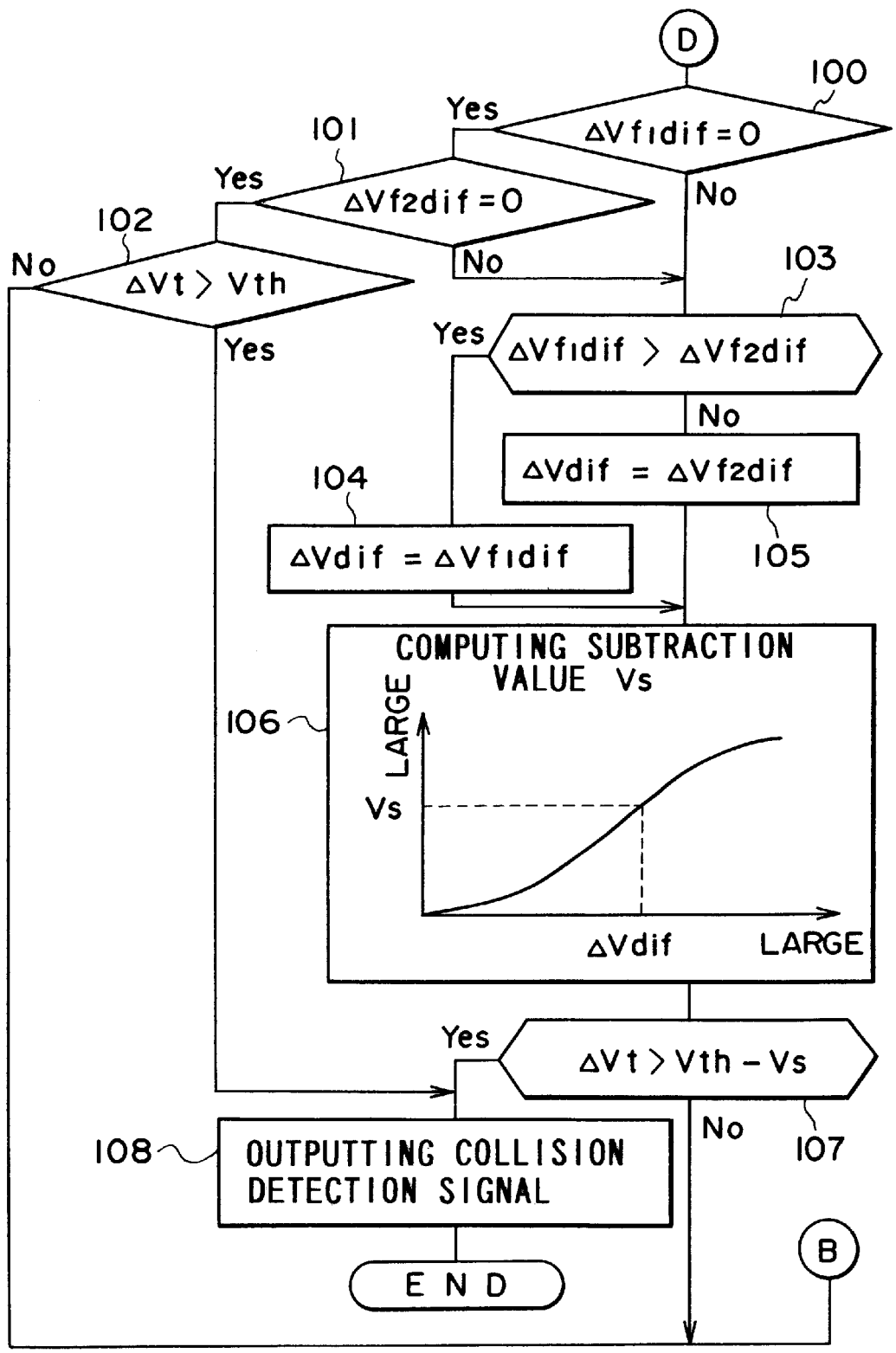
FIG. 10 is a flow diagram of the microcomputer of FIG. 1 showing a fourth embodiment of the present invention, and constitutes the flow diagrams of the microcomputer together with FIG. 4, FIG. 5 and FIG. 6.

FIG. 10 is a flow diagram of the microcomputer 2 of FIG. 1 showing a fourth embodiment. FIG. 10 is applied to the flow diagrams of FIG. 4, FIG. 5 and FIG. 6 in place of the flow diagram of FIG. 7. Terminals B and D of FIG. 10 are connected to terminals having the same signs B and D of FIG. 4 and FIG. 6. That is, FIG. 10 constitutes the flow diagrams of the microcomputer 2 together with FIG. 4, FIG. 5 and FIG. 6.

In the fourth embodiment, a large value out of the variational quantities $\Delta Vf1dif$ and $\Delta Vf2dif$ of the first and second front acceleration sensors 6 and 7 is selected as a variational quantity $\Delta Vdif$, and a subtraction value Vs corresponding to the variational quantity $\Delta Vdif$ is computed based on a conversion map. The conversion map represents a relationship between the variational quantity $\Delta Vdif$ and the subtraction value Vs subtracted from a threshold value Vth toward the integrated value $\Delta Vt$ of the room acceleration sensor 8. Then, the subtraction value Vs computed based on the conversion map is subtracted from the threshold value Vth.

The microcomputer 2 enters from the flow diagram of FIG. 6 to a step 100 of FIG. 10. As described in the third embodiment, if both the variational quantities $\Delta Vf1dif$ and $\Delta Vf2dif$ of the first and second front acceleration sensors 6 and 7 are the initial value namely "0", the microcomputer 2 enters a step 102 through the step 100 and a step 101, and decides whether the integrated value $\Delta Vt$ of the room acceleration sensor 8 is larger than the threshold value Vth. If the integrated value $\Delta Vt$ is smaller than the threshold value Vth, the microcomputer 2 returns to the step 41 of FIG. 4.

If at least one of the variational quantities $\Delta Vf1dif$ and $\Delta Vf2dif$ of the front acceleration sensors 6 and 7 is not "0", the microcomputer 2, as described in the third embodiment, selects the large value out of the variational quantities $\Delta Vf1dif$ and $\Delta Vf2dif$ of the sensors 6 and 7 as the variational quantity $\Delta Vdif$ in steps 103, 104 and 105. Thereafter, the microcomputer 2 enters a step 106, and computes the subtraction value Vs corresponding to the variational quantity $\Delta Vdif$ based on the conversion map representative of the relationship between the variational quantity $\Delta Vdif$ and the subtraction value Vs. The subtraction value Vs is small when the variational quantity $\Delta Vdif$ is small, and it becomes larger according as the variational quantity $\Delta Vdif$ becomes larger. The microcomputer 2 enters a step 107 after the step 106, decreases the threshold value Vth by subtracting the subtraction value Vs computed at the step 106 from the threshold value Vth, and decides whether the integrated value $\Delta Vt$ of the room acceleration sensor 8 is larger than a decreased threshold value Vth–Vs. If the integrated value $\Delta Vt$ is smaller than the decreased threshold value Vth–Vs, the microcomputer 2 returns to the step 41 of FIG. 4. If the integrated value $\Delta Vt$ exceeds the decreased threshold value Vth–Vs, the microcomputer 2 enters from the step 107 to a step 108, outputs the collision detection signal to the drive circuit 5, and finishes the control processing.

Also, as described in the third embodiment, if the integrated value $\Delta Vt$ of the room acceleration sensor 8 is larger than the threshold value Vth in the aforementioned step 102, the microcomputer 2 enters from the step 102 to the step 108, and outputs the collision detection signal to the drive circuit 5.

According to the fourth embodiment, instead of the increment of the integrated value $\Delta Vt$ of the room acceleration sensor 8, the threshold value Vth is decreased by the subtraction value Vs. Therefore, similarly to the first embodiment, it is possible to give the collision detection signal to the drive circuit 5 without causing delay in collision decision. Further, the subtraction value Vs is given according to magnitude of the variational quantity $\Delta Vdif$. That is, in a big collision, the subtraction value Vs becomes larger because the variational quantity $\Delta Vdif$ becomes a large value. In a small collision, the subtraction value Vs becomes smaller because the variational quantity $\Delta Vdif$ becomes a small value. By this, since it is possible to give the subtraction value Vs according to an extent of collision, the occupant protection device 9 can be controlled more exactly.

The conversion map of the step 106, when the variational quantity $\Delta Vdif$ is a negative value, gives "0" as the subtraction value Vs. Therefore, when the vehicle is collided from behind, the microcomputer 2 returns from the step 107 to the step 41 of FIG. 4, and the integrated value $\Delta Vt$ is processed gradually toward the reset direction by the aforementioned reset processing.

Figure 11:
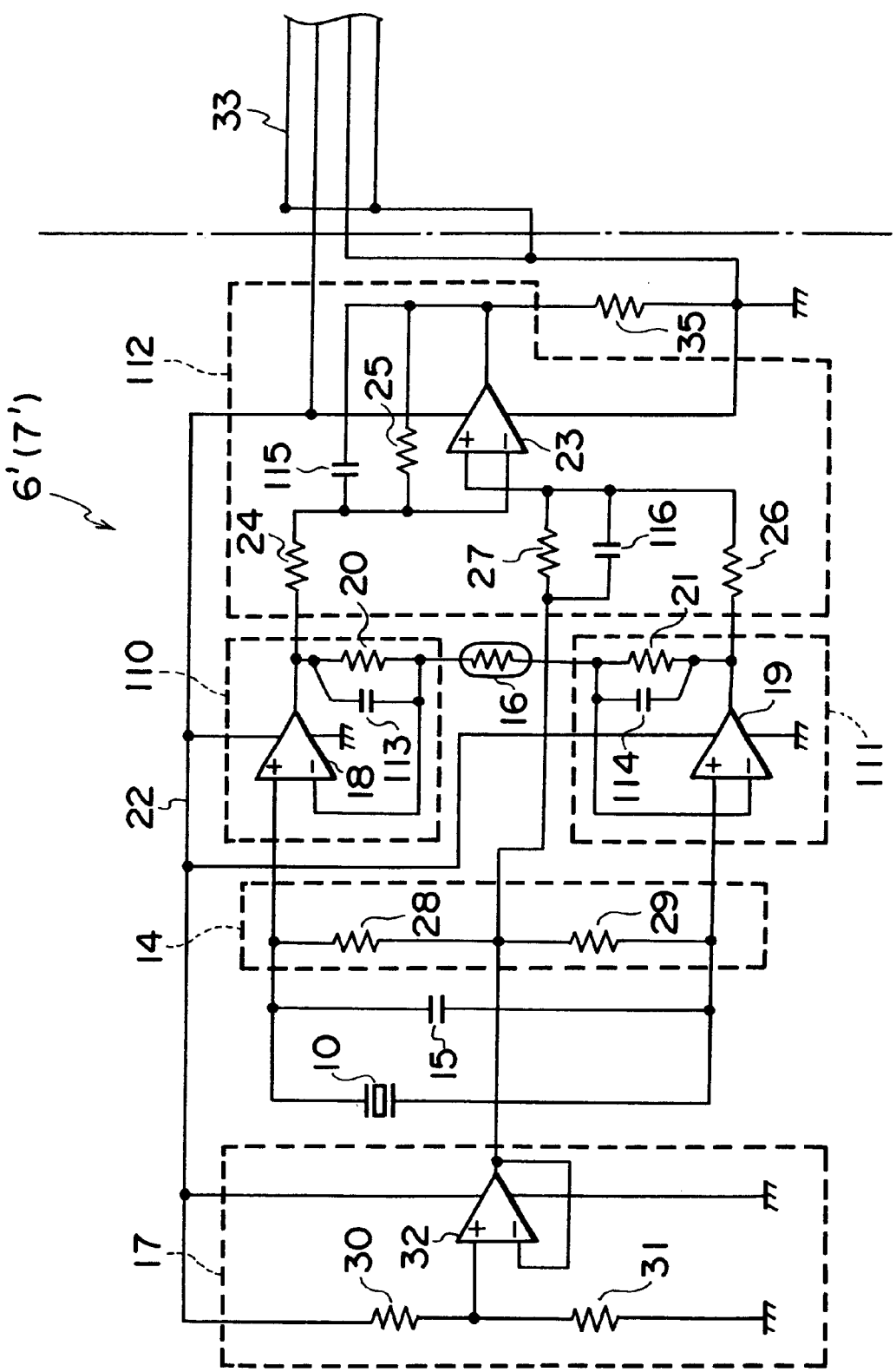
FIG. 11 is a circuit diagram showing another example of the first and second front acceleration sensors in FIG. 1.

FIG. 11 is a circuit diagram showing another example of the first and second front acceleration sensors of FIG. 1. In FIG. 11, components that are given the same reference numerals as those of FIG. 2 indicate the same.

In FIG. 11, a reference numeral 6' (7') is a first (second) front acceleration sensor. The front acceleration sensor 6'

(7') is applied to the composition of FIG. 1 instead of the first (second) front acceleration sensor 6 (7) of FIG. 2. In the front acceleration sensor 6' (7') of this example, an amplifier circuit inputting the voltage outputs of both ends of the piezo-electric element 10 has first and second non-inverting amplifier circuits 110 and 111 with integrating functions and a differential amplifier circuit 112 with an integrating function. By this, the front acceleration sensor 6' (7') outputs an integrated value of an acceleration signal as a sensor output. The first and second non-inverting amplifier circuits 110 and 111 have condensers 113 and 114 each inserted in parallel with the resistors 20 and 21, in addition to the composition of the first and second non-inverting amplifier circuits 11 and 12 of FIG. 2. The differential amplifier circuit 112 has condensers 115 and 116 each inserted in parallel with the resistors 25 and 27, in addition to the composition of the differential amplifier circuit 13 of FIG. 2. According to a composition like this, the integrated value of the acceleration signal, as the sensor output, is given from the front acceleration sensor 6' (7') to the microcomputer 2 of FIG. 1. In this example, composition and operation of other portions are as described in relation to FIG. 2.

Although in the example of FIG. 11 the first and second non-inverting amplifier circuits 110 and 111 and the differential amplifier circuit 112 each have the integrating function, either the first and second non-inverting amplifier circuits 110 and 111 or the differential amplifier circuit 112 may have the integrating function.

Figure 12:
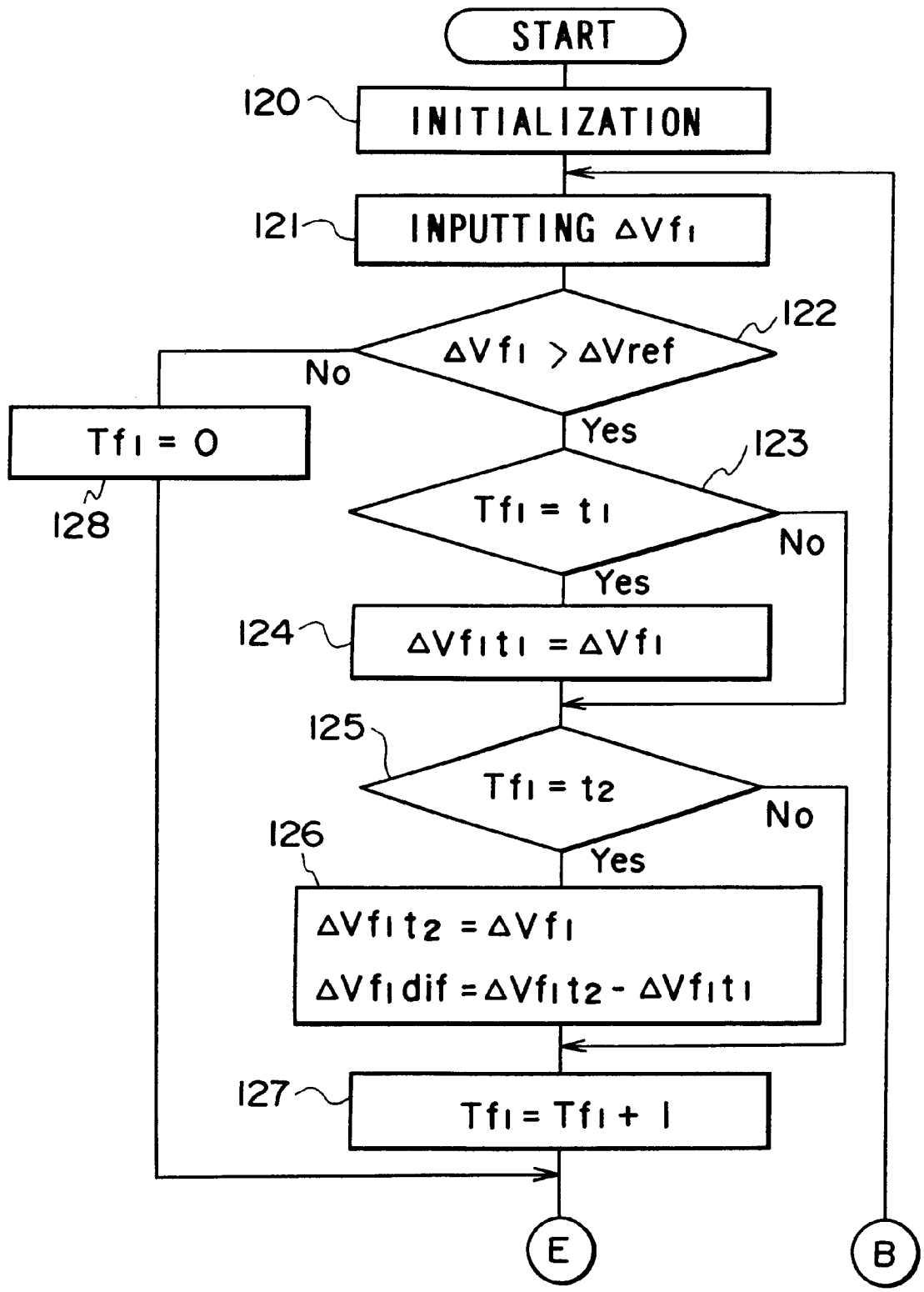
FIG. 12 and FIG. 13 are flow diagrams of the microcomputer of FIG. 1 showing a fifth embodiment of the present invention, and constitute the flow diagrams of the microcomputer together with FIG. 6 and FIG. 7.
Figure 13:
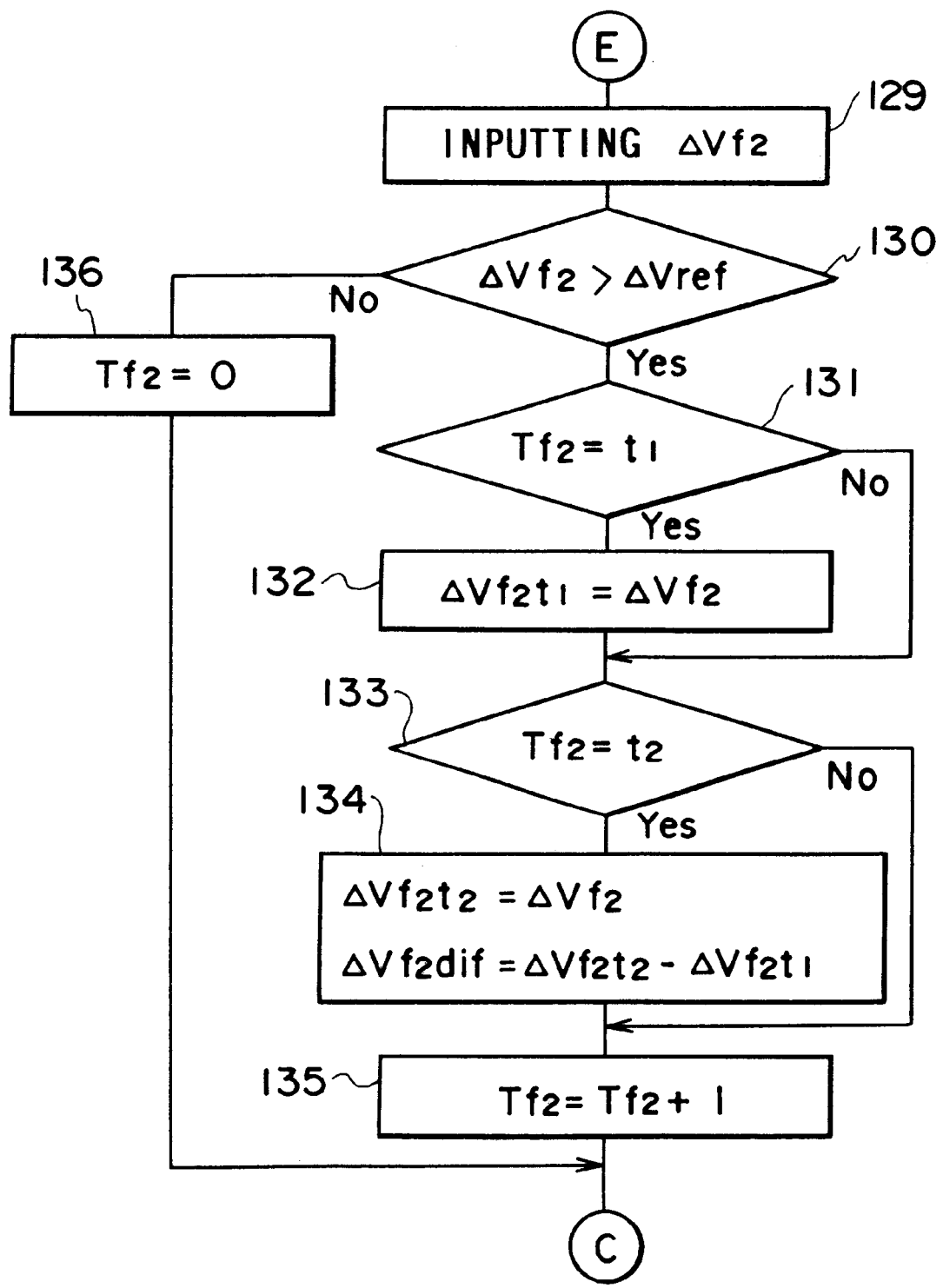

FIG. 12 and FIG. 13 are flow diagrams of the microcomputer 2 of FIG. 1 showing a fifth embodiment. FIG. 12 and FIG. 13 show the flow diagrams in the case in which the first and second front acceleration sensors 6' and 7' of FIG. 11 are used, and these are applied to the flow diagrams of FIG. 6 and FIG. 7 in place of the flow diagrams of FIG. 4 and FIG. 5. A terminal B of FIG. 12 is connected to a terminal having the same sign B of FIG. 7, and terminals E and C of FIG. 13 are connected to terminals having the same signs E and C of FIG. 6 and FIG. 12. That is, FIG. 12 and FIG. 13 constitute the flow diagrams of the microcomputer 2 together with FIG. 6 and FIG. 7.

The microcomputer 2 of the control unit 1, when a control processing is started, enters a step 121 after an initialization of a step 120. In the step 121, the microcomputer 2 inputs an integrated value $\Delta Vf1$ of an acceleration signal from the first front acceleration sensor 6', and enters a step 122. In the step 122, whether the integrated value $\Delta Vf1$ is larger than a reference value $\Delta Vref$. The reference value $\Delta Vref$ is a threshold value for deciding whether the integrated value $\Delta Vf1$ is an integrated value of an acceleration signal cased by a collision. The reference value $\Delta Vref$ is also applied to an integrated value $\Delta Vf2$ which is the sensor output of the second front acceleration sensor 7'. The reference value $\Delta Vref$ is set based on an integrated value of the front reference value Gfo described above, for example. If the integrated value $\Delta Vf1$ is larger than the reference value $\Delta Vref$, the microcomputer 2 recognizes that the integrated value $\Delta Vf1$ is the sensor output caused by a collision, and enters steps 123–126 for detecting a variational quantity $\Delta Vf1dif$ of the integrated value $\Delta Vf1$ of the first front acceleration sensor 6'. In the detection of the variational quantity $\Delta Vf1dif$ of the steps 123–126, the same processing as the aforementioned detection processing of the steps 43–46 of FIG. 4 is performed. A first soft-timer Tf1 is reset to "0" in the initialization of the step 120 and a step 128, and is increased by +1 in a step 127. By this, the first soft-timer Tf1 is designed to count the time elapsed from the reset state of "0" when a collision has been recognized based on the first front acceleration sensor 6'. The microcomputer 2 enters from the step 125 or the step 126 in the detection processing of the variational quantity $\Delta Vf1dif$ to the step 127, increases the first soft-timer Tf1 by +1, and then enters a step 129 of FIG. 13. In the aforementioned step 122, if the integrated value $\Delta Vf1$ of the first front acceleration sensor 6' is smaller than the reference value $\Delta Vref$, the microcomputer 2 resets the first soft-timer Tf1 to "0" in the step 128, and enters the step 129 of FIG. 13.

In the step 129 of FIG. 13, the microcomputer 2 inputs an integrated value $\Delta Vf2$ of an acceleration signal from the second front acceleration sensor 7', and enters a step 130. In the step 130, whether the integrated value $\Delta Vf2$ is larger than the reference value $\Delta Vref$. If the integrated value $\Delta Vf2$ is larger than the reference value $\Delta Vref$, the microcomputer 2 recognizes that the integrated value $\Delta Vf2$ is the sensor output caused by the collision, and enters steps 131–134 for detecting a variational quantity $\Delta Vf2dif$ of the integrated value $\Delta Vf2$ of the second front acceleration sensor 7'. In the detection of the variational quantity $\Delta Vf2dif$ of the steps 131–134, the same processing as the aforementioned detection processing of the steps 56–59 of FIG. 5 is performed. A second soft-timer Tf2 is reset to "0" in the initialization of the step 120 and a step 136, and is increased by +1 in a step 135. By this, the second soft-timer Tf2 is designed to count the time elapsed from the reset state of "0" when a collision has been recognized based on the second front acceleration sensor 7'. The microcomputer 2 enters from the step 133 or the step 134 in the detection processing of the variational quantity $\Delta Vf2dif$ to the step 135, increases the second soft-timer Tf2 by +1, and then enters the step 67 of FIG. 6. In the aforementioned step 130, if the integrated value $\Delta Vf2$ of the second front acceleration sensor 7' is smaller than the reference value $\Delta Vref$, the microcomputer 2 resets the second soft-timer Tf2 to "0" in the step 136, and enters the step 67 of FIG. 6. The control processings of FIG. 6 and FIG. 7 are as described in the first embodiment.

According to the fifth embodiment, since the microcomputer 2 does not need to perform an integration and a reset processing in relation to the sensor outputs of the first and second front acceleration sensors 6' and 7', simplification of composition as well as an improvement in processing speed can be achieved.

Although in the fifth embodiment the integrated value $\Delta Vt$ of the room acceleration sensor 8 is increased by the control processing of FIG. 7, this is not intended to limit the scope of the invention. It goes without saying that the aforementioned control processing of FIG. 8, FIG. 9 or FIG. 10 can be applied to this embodiment.

Figure 14:
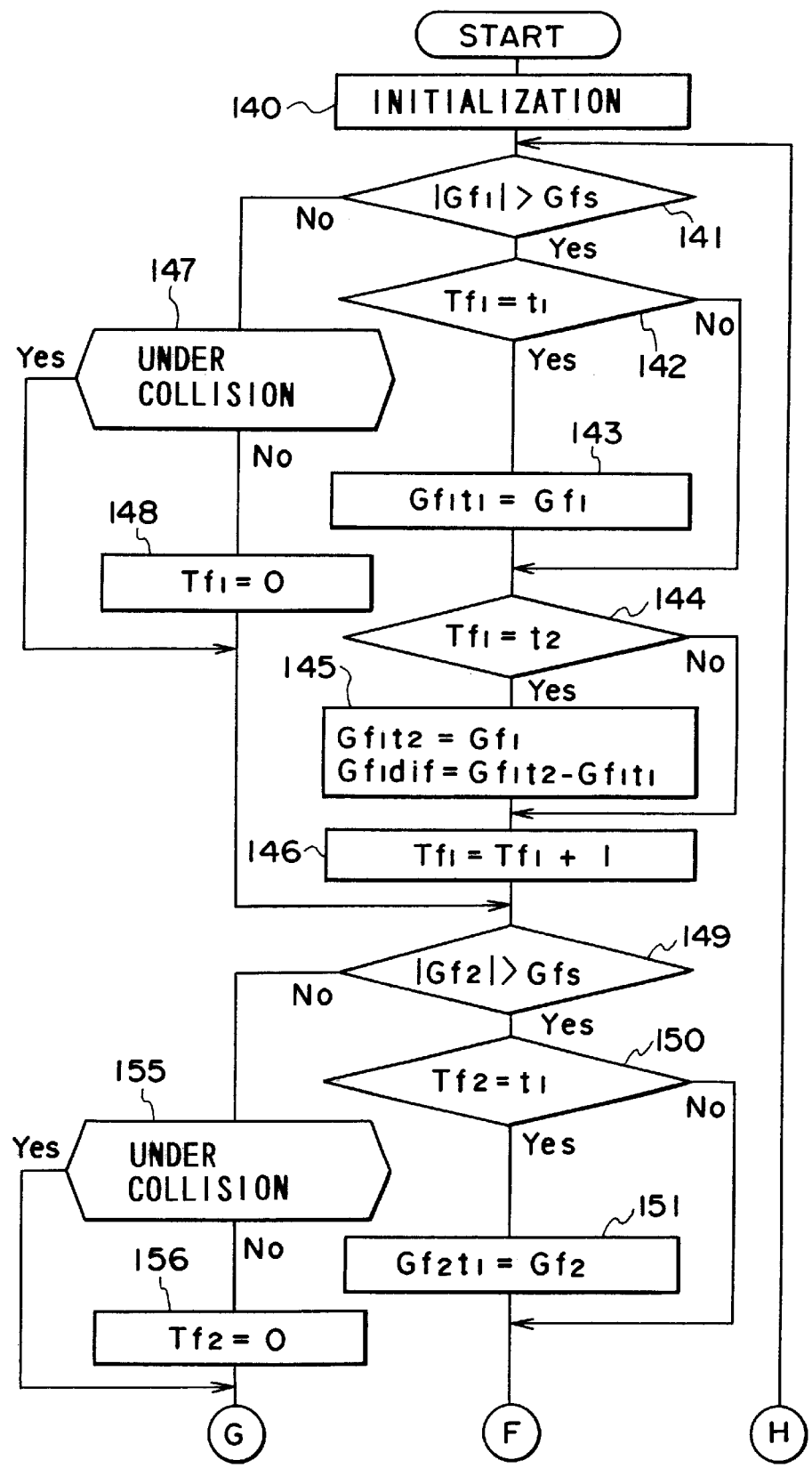
FIG. 14, FIG. 15 and FIG. 16 are flow diagrams of the microcomputer of FIG. 1 showing a sixth embodiment of the present invention.
Figure 15:
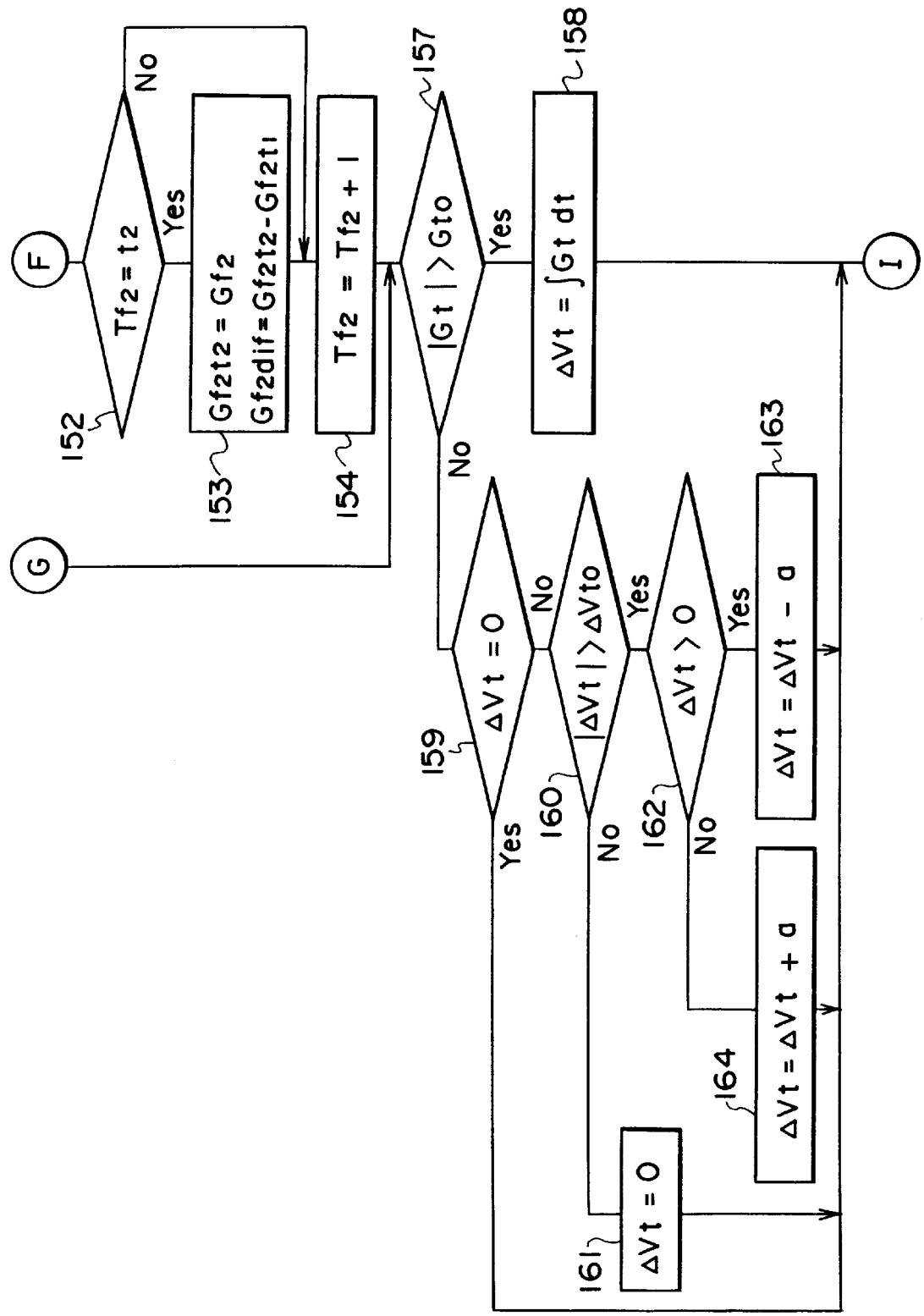
Figure 16:
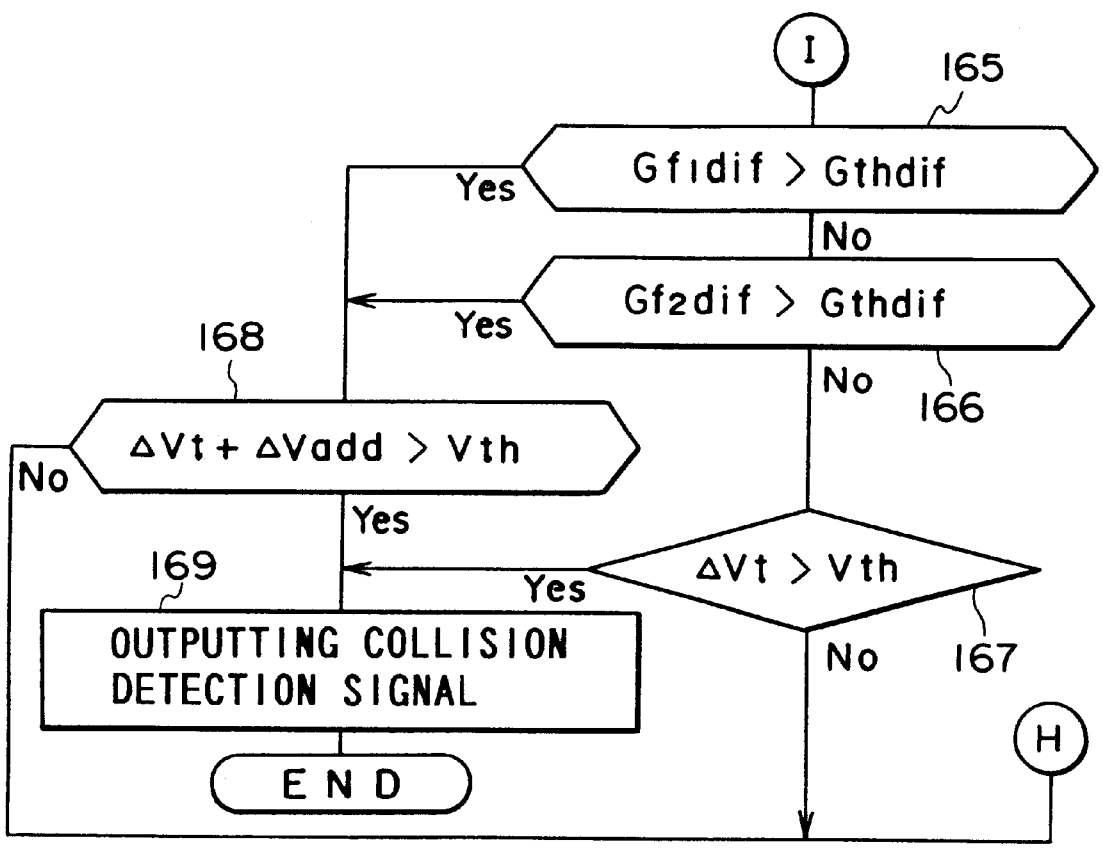

FIG. 14, FIG. 15, and FIG. 16 are flow diagrams of the microcomputer 2 of FIG. 1 showing a sixth embodiment. Terminals F and G of FIG. 15 are connected to terminals having the same signs F and G of FIG. 14, and terminals H and I of the FIG. 16 are connected to terminals having the same signs H and I of FIG. 14 and FIG. 15.

In the six th embodiment, the integrated value $\Delta Vt$ of the room acceleration sensor 8 is increased based on variational quantities Gf1dif and Gf2dif of the acceleration signals Gf1 and Gf2 of the first and second front acceleration sensors 6 and 7.

The microcomputer 2, when a control processing is started, enters a step 141 after an initialization of a step 140. In the step 141, the microcomputer 2 inputs the acceleration signal Gf1 of the first front acceleration sensor 6, and decides whether an absolute value of the acceleration signal Gf1 is larger than a reference value Gfs. The reference value Gfs is set so that a detection of the variational quantity Gf1*dif* of the acceleration signal Gf1 is not started against a non-collision acceleration of the vehicle occurring by a sudden braking and so on. The reference value Gfs is also applied to the acceleration signal Gf2 of the second front acceleration sensor 7. The reference value Gfs is set to the same value as the front reference value Gfo described in the first embodiment, for example. If the absolute value of the acceleration signal Gf1 is larger than the reference value Gfs in the step 141, the microcomputer 2 recognizes that the acceleration signal Gf1 is a collision acceleration signal caused by a collision, and enters steps 142–145 for detecting the variational quantity Gf1*dif* of the acceleration signal Gf1 of the first front acceleration sensor 6. In the detection of the variational quantity Gf1*dif* of the steps 142–145, the same processing as the steps 43–46 of FIG. 4 is performed in respect to the acceleration signal Gf1. That is, in the step 142, whether a first soft-timer Tf1 is the first time point t1 is decided. The first soft-timer Tf1 is reset to "0" in the initialization of the step 140 and a step 148, and is increased by +1 in a step 146. By this, the first soft-timer Tf1 is designed to count the time elapsed from the reset state of "0" when a collision has been recognized based on the first front acceleration sensor 6. If the first soft-timer Tf1 is the first time point t1 in the step 142, the microcomputer 2 enters a step 143, stores the acceleration signal Gf1 at this time as an acceleration signal Gf1t1 of the first time point t1, and then enters a step 144. If the first soft-timer Tf1 is not the first time point t1, the microcomputer 2 directly enters from the 142 to the step 144 without entering the step 143. In the step 144, whether the first soft-timer Tf1 is the second time point t2 after lapse of the predetermined time from the first time point t1 is decided. If the first soft-timer Tf1 is the second time point t2, the microcomputer 2 enters a step 145, and stores the acceleration signal Gf1 at this time as an acceleration signal Gf1t2 of the second time point t2. Then, the microcomputer 2 detects the variational quantity Gf1*dif* of the acceleration signal Gf1 of the first front acceleration sensor 6 by subtracting the acceleration signal Gf1t1 of the first time point t1 from the acceleration signal Gf1t2 of the second time point t2, and enters a following step 146. If the first soft-timer Tf1 is not the second time point t2, the microcomputer 2 directly enters from the step 144 to the step 146 without entering the step 145. In the step 146, the first soft-timer Tf1 is increased by +1. Thereafter, the microcomputer 2 enters a step 149.

On the other hand, in the step 141, if the absolute value of the acceleration signal Gf1 is smaller than the reference value Gfs, the microcomputer 2 enters a step 147. In the step 147, whether the vehicle is under the collision is decided. If the vehicle is not under the collision, the microcomputer 2 resets the first soft-timer Tf1 to "0" in the step 148, and then enters the step 149. If the vehicle is under the collision, the microcomputer 2 directly enters the step 149 without resetting the first soft-timer Tf1. Whether the vehicle is under the collision is decided based on whether a small condition of the acceleration signal Gf1 against the reference value Gfs is a temporary phenomenon or a continuous phenomenon, for example. That is, if the small condition of the acceleration signal Gf1 is the temporary phenomenon, the microcomputer 2 recognizes that the vehicle is under the collision. If the small condition is the continuous phenomenon, the microcomputer 2 recognizes that the vehicle is not under the collision. By this, even if the absolute value of the acceleration sensor Gf1 temporarily becomes smaller than the reference value Gfs during the collision, the first soft-timer Tf1 is not reset to "0".

In the step 149, the microcomputer 2 inputs the acceleration signal Gf2 of the second front acceleration sensor 7, and decides whether an absolute value of the acceleration signal Gf2 is larger than the reference value Gfs. If the absolute value of the acceleration signal Gf2 is larger than the reference value Gfs, the microcomputer 2 recognizes that the acceleration signal Gf2 is a collision acceleration signal caused by the collision, and enters steps 150–153 for detecting the variational quantity Gf2*dif* of the acceleration signal Gf2 of the second front acceleration sensor 7. In the detection of the variational quantity Gf2*dif* of the steps 150–153, the same processing as the steps 56–59 of FIG. 5 is performed in respect to the acceleration signal Gf2. That is, in the step 150, whether a second soft-timer Tf2 is the first time point tf is decided. The second soft-timer Tf2 is reset to "0" in the initialization of the step 140 and a step 156, and is increased by +1 in a step 154. By this, the second soft-timer Tf2 is designed to count the time elapsed from the reset state of "0" when a collision has been recognized based on the second front acceleration sensor 7. If the second soft-timer Tf2 is the first time point t1 in the step 150, the microcomputer 2 enters a step 151, stores the acceleration signal Gf2 at this time as an acceleration signal Gf2t1 of the first time point t1, and then enters a step 152 of FIG. 15. If the second soft-timer Tf2 is not the first time point t1, the microcomputer 2 directly enters from the 150 to the step 152 of FIG. 15 without entering the step 151. In the step 152 of FIG. 15, whether the second soft-timer Tf2 is the second time point t2 is decided. If the second soft-timer Tf2 is the second time point t2, the microcomputer 2 enters a step 153, and stores the acceleration signal Gf2 at this time as an acceleration signal Gf2t2 of the second time point t2. Then, the microcomputer 2 detects the variational quantity Gf2*dif* of the acceleration signal Gf2 of the second front acceleration sensor 7 by subtracting the acceleration signal Gf2t1 of the first time point t1 from the acceleration signal Gf2t2 of the second time point t2, and enters a following step 154. If the second soft-timer Tf2 is not the second time point t2, the microcomputer 2 directly enters from the step 152 to the step 154 without entering the step 153. In the step 154, the second soft-timer Tf2 is increased by +1. Thereafter, the microcomputer 2 enters a step 157.

On the other hand, in the step 149 of FIG. 14, if the absolute value of the acceleration signal Gf1 is smaller than the reference value Gfs, the microcomputer 2 enters a step 155, and decides whether the vehicle is under the collision. If the vehicle is not under the collision, the microcomputer 2 resets the second soft-timer Tf2 to "0" in the step 156, and then enters the step 157 of FIG. 15. If the vehicle is under the collision, the microcomputer 2 directly enters the step 157 of FIG. 15 without resetting the second soft-timer Tf1.

In the step 157 of FIG. 15, the microcomputer 2 inputs an acceleration signal Gt of the room acceleration sensor 8, and decides whether an absolute value of the acceleration signal Gt is larger than a reference value Gto. The reference value Gto is the room reference value Gto described in the first embodiment. If the absolute value of the acceleration signal Gt is larger than the reference value Gto, the microcomputer 2 computes an integrated value ΔVt of the acceleration signal Gt in a step 158, and then enters a step 165 of FIG. 16. In the step 157, if the absolute value of the acceleration signal Gt is smaller than the reference value Gto, the microcomputer 2 enters a reset processing of steps 159–164, and goes to the step 165 of FIG. 16 after the reset processing. In the reset processing of the steps 159–164, the same processing as the aforementioned reset processing of the steps 69–74 of FIG. 6 is executed.

In FIG. 16, based on the variational quantities Gf1*dif* and Gf2*dif* of the acceleration signals Gf1 and Gf2 of the first and second front acceleration sensors 6 and 7, the same control processing as FIG. 7 is performed. That is, if both the variational quantity Gf1*dif* of the first front acceleration sensor 6 and the variational quantity Gf2*dif* of the second front acceleration sensor 7 are smaller than a predetermined value Gthdif, and if the integrated value ΔVt of the room acceleration sensor 8 is smaller than a predetermined threshold value Vth, the microcomputer 2 returns to the step 141 of FIG. 14 through steps 165, 166 and 167. If at least one of the variational quantities Gf1*dif* and Gf2*dif* of the first and second front acceleration sensors 6 and 7 exceeds the predetermined value Gthdif, the microcomputer 2 enters from the step 165 or the step 166 to a step 168, increases the integrated value ΔVt of the room acceleration sensor 8 by adding a predetermined addition value ΔVadd to the integrated value ΔVt, and decides whether an increased value ΔVt+ΔVadd is larger than the threshold value Vth. If the increased value ΔVt+ΔVadd is smaller than the threshold value Vth, the microcomputer returns to the step 141 of FIG. 14. If the increased value ΔVt+ΔVadd exceeds the threshold value Vth, the microcomputer enters from the step 168 to a step 169, outputs the collision detection signal to the drive circuit 5, and finishes the control processing. Also, in the aforementioned step 167, if the integrated value ΔVt of the room acceleration sensor 8 exceeds the threshold value Vth, the microcomputer 2 enters from the step 167 to the step 169, and outputs the collision detection signal to the drive circuit 5. The drive circuit 5, when the collision detection signal is provided from the microcomputer 2, outputs the drive signal to the occupant protection device 9, and thereby the occupant protection device 9 is driven.

According to the sixth embodiment, based on the variational quantities Gf1*dif* and Gf2*dif* of the acceleration signals Gf1 and Gf2 of the first and second front acceleration sensors 6 and 7, the integrated value ΔVt of the room acceleration sensor 8 is increased. Hence, even in case of a collision in which a collision acceleration transmitted to the room acceleration sensor 8 provided on the floor tunnel may be weakened, the collision detection signal is given to the drive circuit 5 without causing delay in collision decision. Also, in case of a collision, such as a head-on collision against a concrete wall, in which a collision acceleration is easily transmitted to the floor tunnel, even if both the variational quantities Gf1*dif* and Gf2*dif* of the front acceleration sensors 6 and 7 are smaller than the predetermined value Gthdif, it is possible to give the collision detection signal to the drive circuit 5 at an early stage based on the integrated value ΔVt itself of the room acceleration sensor 8.

Although in the sixth embodiment the integrated value ΔVt of the room acceleration sensor 8 is increased by adding the predetermined addition value ΔVadd, this is not intended to limit the scope of the invention. It goes without saying that the same control processing as the processing of FIG. 8, FIG. 9 or FIG. 10 can be applied to this embodiment.

Figure 17:
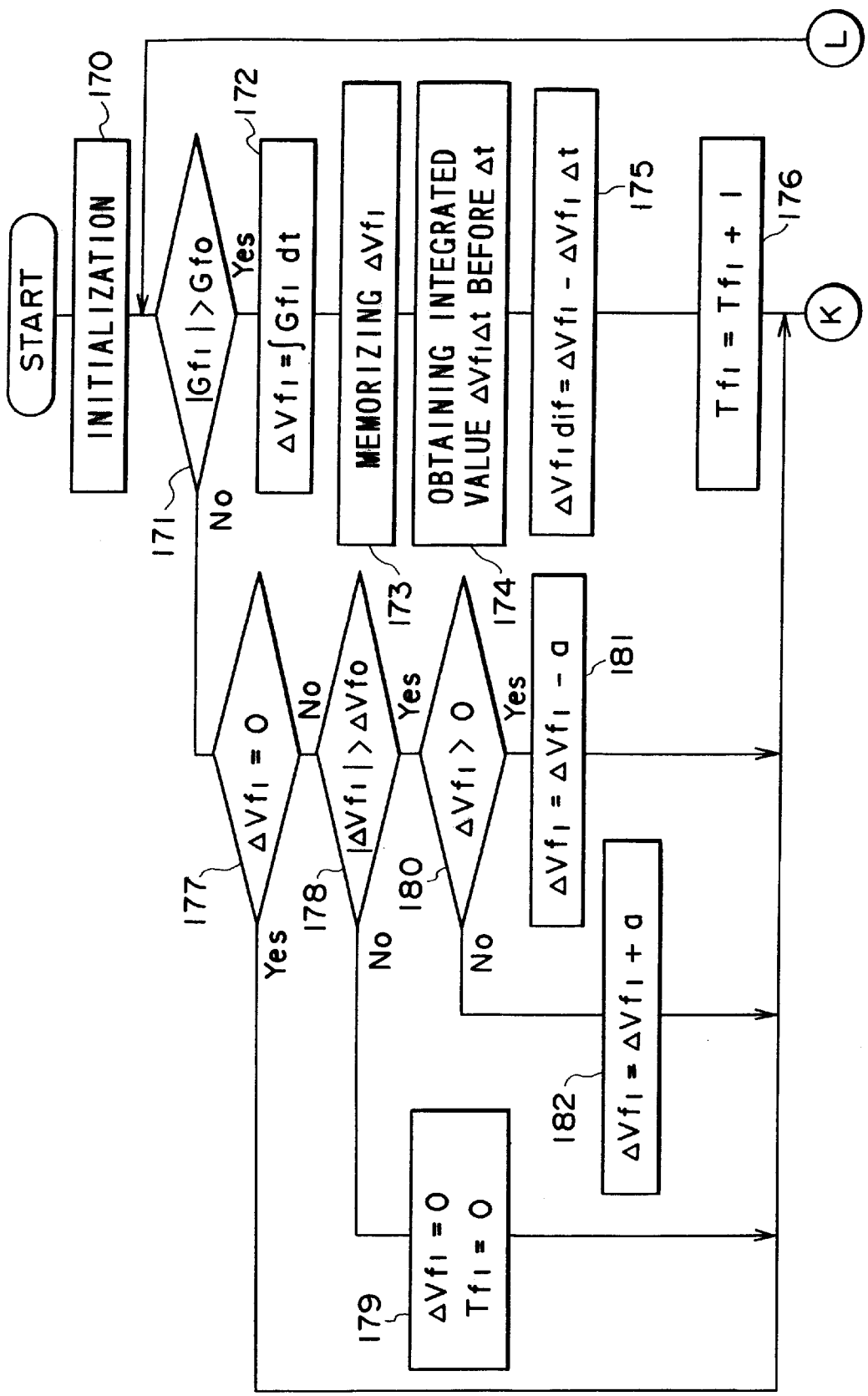
FIG. 17, FIG. 18, FIG. 19 and FIG. 20 are flow diagrams of the microcomputer of FIG. 1 showing a seventh embodiment of the present invention.
Figure 18:
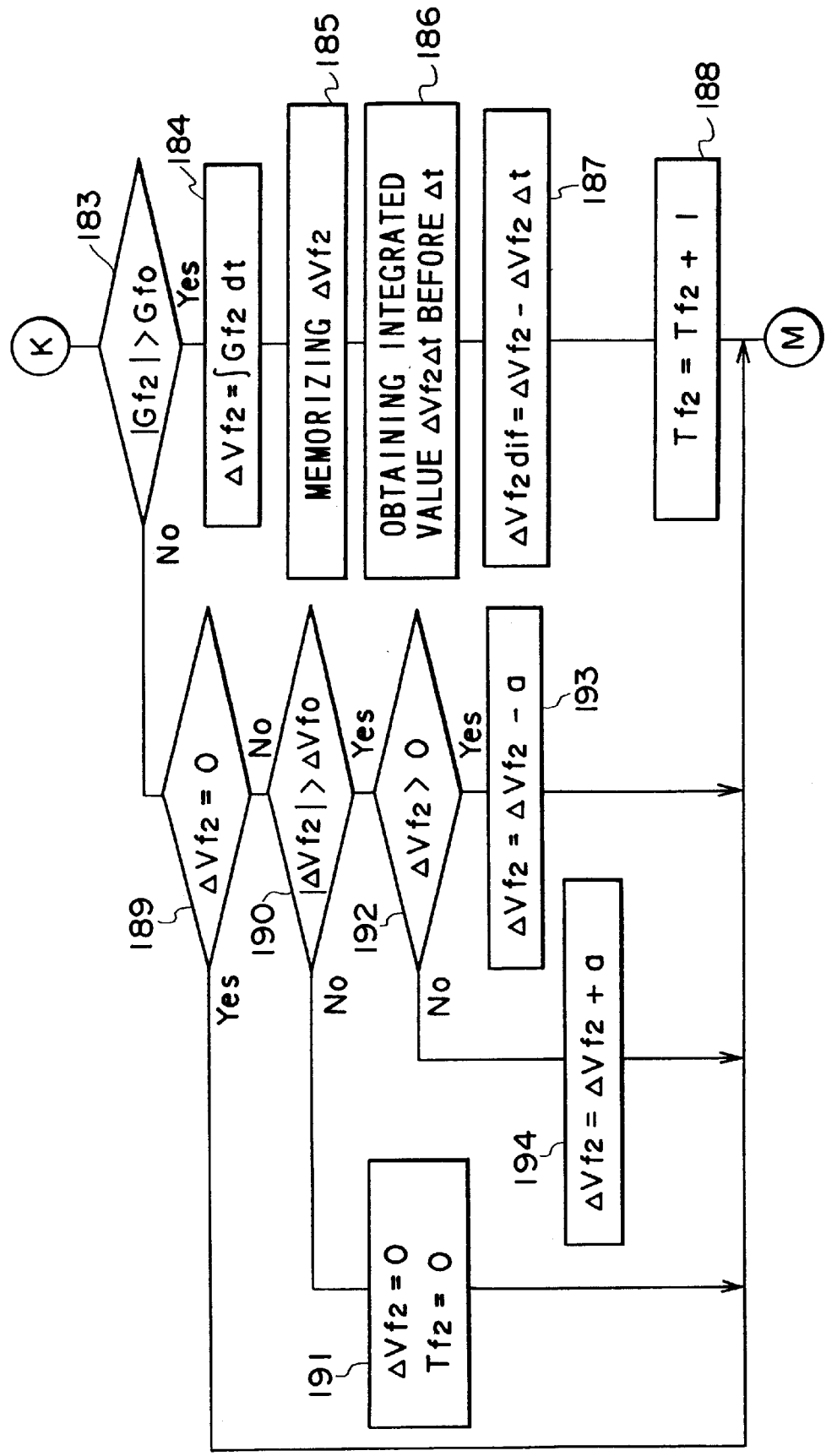
Figure 19:
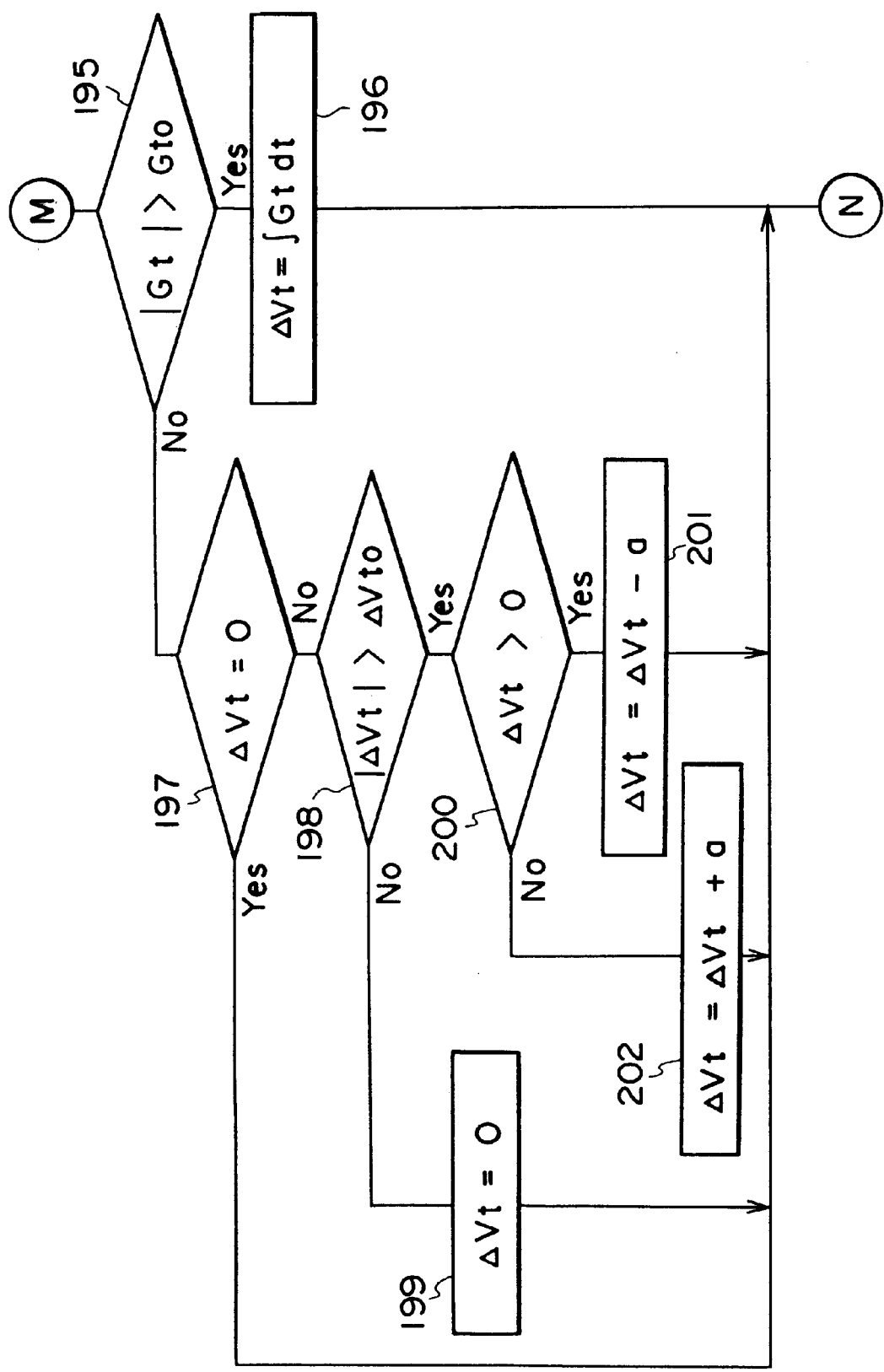
Figure 20:
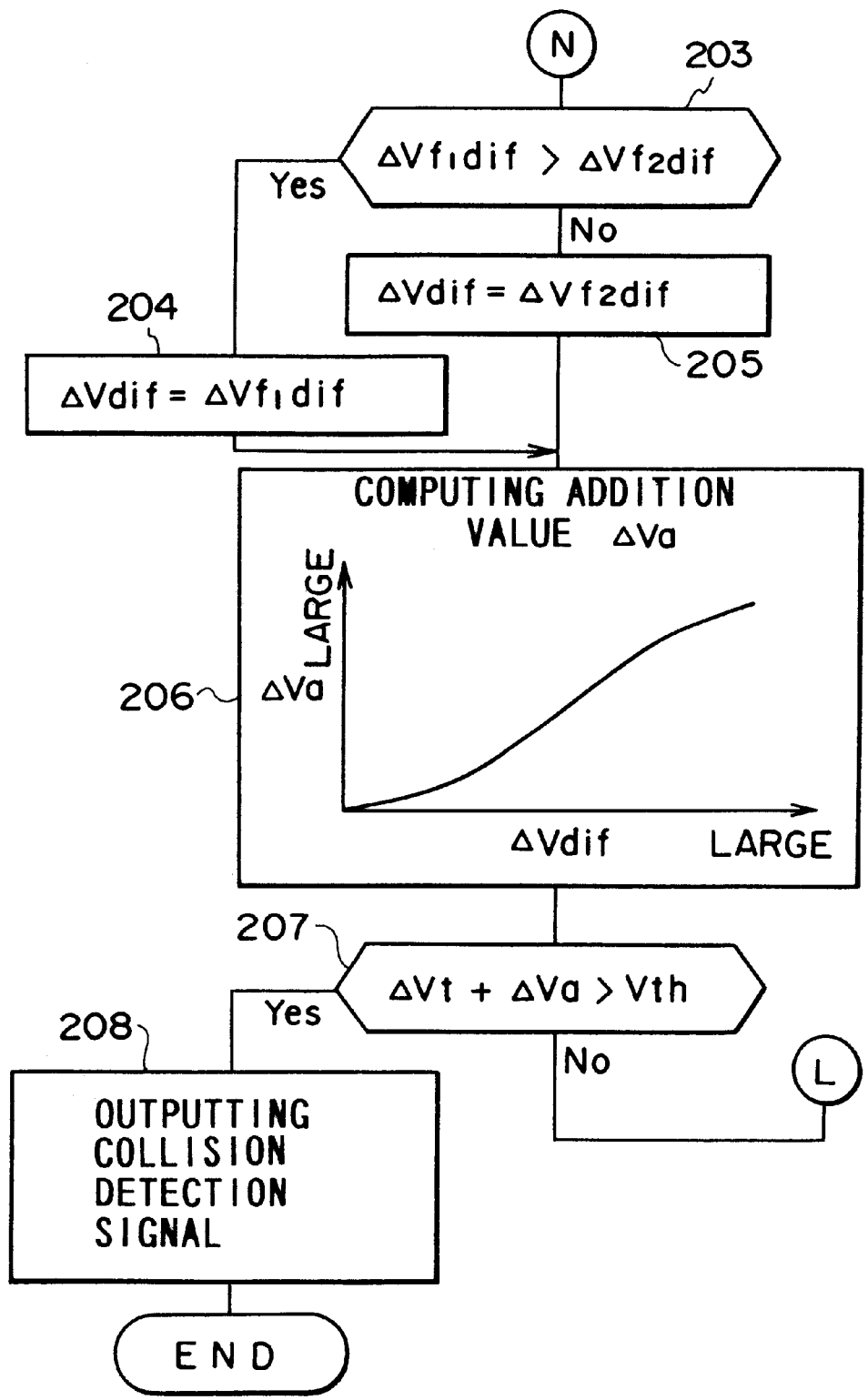

FIG. 17, FIG. 18, FIG. 19 and FIG. 20 are flow diagrams of the microcomputer 2 of FIG. 1 showing a seventh embodiment. A terminal K of FIG. 18 is connected to a terminal having the same sign K of FIG. 17, a terminal M of FIG. 19 is connected to a terminal having the same sign M of FIG. 18, and terminals L and N of the FIG. 20 are connected to terminals having the same signs L and N of FIG. 17 and FIG. 19.

In the seventh embodiment, when the vehicle is under a collision, a variational quantity ΔVf1*dif* (ΔVf2*dif*) of an integrated value ΔVf1 (ΔVf2) of the acceleration signal Gf1 (Gf2) of the first (second) front acceleration sensor 6 (7) is detected consecutively based on a current integrated value ΔVf1 (ΔVf2) of the sensor 6 (7) and an integrated value ΔVf1Δt (ΔVf2Δt) of sensor 6 (7) before a predetermined time Δt. Therefore, the variational quantity ΔVf1*dif* (ΔVf2*dif*) changes every moment according to progress of the collision.

The microcomputer 2, when a control processing is started, enters a step 171 after an initialization of a step 170. In the step 171, the microcomputer 2 inputs the acceleration signal Gf1 of the first front acceleration sensor 6, and decides whether an absolute value of the acceleration signal Gf1 is larger than a front reference value Gfo. The front reference value Gfo is as described in the first embodiment. If the absolute value of the acceleration signal Gf1 is larger than the reference value Gfo, the microcomputer 2 recognizes that the acceleration signal Gf1 is a collision acceleration signal caused by a collision, and computes the integrated value ΔVf1 of the acceleration signal Gf1 in a step 172. Then, the microcomputer 2 enters steps 173–175 for detecting the variational quantity ΔVf1*dif* of the integrated value ΔVf1 of the first front acceleration sensor 6.

In the step 173, the current integrated value ΔVf1 computed in the step 172 is memorized. In this embodiment, the current integrated value ΔVf1 is memorized at an address which is based on a current time of a first soft-timer Tf1. In a following step 174, the microcomputer 2, based on the current time of the first soft-timer Tf1, obtains the integrated value ΔVf1Δt of the first front acceleration sensor 6 before the predetermined time Δt from the current time. If a time point before the predetermined time Δt is a time point before starting of the collision, a value "0" is given as the integrated value ΔVf1Δt before the predetermined time Δt. In a following step 175, the microcomputer 2 detects the variational quantity ΔVf1*dif* of the first front acceleration sensor 6 by subtracting the integrated value ΔVf1Δt before the predetermined time Δt from the current integrated value ΔVf1, and then enters a step 176. In the step 176, the first soft-timer Tf1 is increased by +1. Thereafter, the microcomputer 2 enters a step 183 of FIG. 18. The first soft-timer Tf1 is reset to "0" in the initialization of the step 170 and a step 179 in a reset processing, and is increased by +1 in the step 176. By this, the first soft-timer Tf1 is designed to count lapse of time from the reset state of "0" when a collision has been recognized based on the first front acceleration sensor 6. When the vehicle is under a collision, since the microcomputer 2 almost goes through the steps 172, 173, 174 and 175, the variational quantity ΔVf1*dif* of the integrated value ΔVf1 changing every moment is detected consecutively.

On the other hand, in the step 171, if the absolute value of the acceleration signal Gf1 is smaller than the front reference value Gfo, the microcomputer 2 enters a reset processing of steps 177–182, and goes to the step 183 of FIG. 18 after the reset processing. In the reset processing of the steps 177–182, the same processing as the aforementioned reset processing of the steps 48–53 in FIG. 4 is executed.

In the step 183 of FIG. 18, the microcomputer 2 inputs the acceleration signal Gf2 of the second front acceleration sensor 7, and decides whether an absolute value of the acceleration signal Gf2 is larger than the front reference value Gfo. If the absolute value of the acceleration signal Gf2 is larger than the reference value Gfo, the microcomputer 2 recognizes that the acceleration signal Gf2 is a collision acceleration signal caused by the collision, and computes the integrated value ΔVf2 of the acceleration signal Gf2 in a step 184. Then, the microcomputer 2 enters steps 185–187 for detecting the variational quantity ΔVf2*dif* of the integrated value ΔVf2 of the second front acceleration sensor 7. In the step 185, the current integrated value ΔVf2 computed in the step 184 is memorized. In this embodiment, the current integrated value ΔVf2 is memorized at an address which is based on a current time of a second soft-timer Tf2. In a following step 186, the microcomputer 2, based on the current time of the second soft-timer Tf2, obtains the integrated value ΔVf2Δt of the second front acceleration sensor 7 before the predetermined time Δt from the current time. If a time point before the predetermined time Δt is a time point before starting of the collision, a value "0" is given as the integrated value ΔVf2Δt before the predetermined time Δt. In a following step 187, the microcomputer 2 detects the variational quantity ΔVf2*dif* of the second front acceleration sensor 7 by subtracting the integrated value ΔVf2Δt before the predetermined time Δt from the current integrated value ΔVf2. Thereafter, the microcomputer 2 increases the second soft-timer Tf2 by +1 in a step 188, and then enters a step 195 of FIG. 19. The second soft-timer Tf2 is reset to "0" in the initialization of the step 170 and a step 191 in a reset processing, and is increased by +1 in the step 188. By this, the second soft-timer Tf2 is designed to count lapse of time from the reset state of "0" when a collision has been recognized based on the second front acceleration sensor 7. When the vehicle is under a collision, since the microcomputer 2 almost goes through the steps 184, 185, 186 and 187, the variational quantity ΔVf2*dif* of the integrated value ΔVf2 changing every moment is detected consecutively.

On the other hand, in the step 183, if the absolute value of the acceleration signal Gf2 is smaller than the front reference value Gfo, the microcomputer 2 enters a reset processing of steps 189–194, and goes to the step 195 of FIG. 19 after the reset processing. In the reset processing of the steps 189–194, the same processing as the aforementioned reset processing of the steps 61–66 in FIG. 5 is executed.

In the step 195 of FIG. 19, the microcomputer 2 inputs an acceleration signal Gt of the room acceleration sensor 8, and decides whether an absolute value of the acceleration signal Gt is larger than a room reference value Gto. The room reference value Gto is as described in the first embodiment. In the step 195, if the absolute value of the acceleration signal Gt is larger than the reference value Gto, the microcomputer 2 computes an integrated value ΔVt of the acceleration signal Gt in a step 196, and then enters a step 203 of FIG. 20.

On the other hand, in the step 195, if the absolute value of the acceleration signal Gt is smaller than the reference value Gto, the microcomputer 2 enters a reset processing of steps 197–202, and goes to the step 203 of FIG. 20 after the reset processing. In the reset processing of the steps 197–202, the same processing as the aforementioned reset processing of the steps 69–74 in FIG. 6 is executed.

In the step 203 of FIG. 20, the microcomputer 2 makes a comparison between the variational quantity ΔVf1*dif* of the first front acceleration sensor 6 and the variational quantity ΔVf2*dif* of the second front acceleration sensor 7. If the variational quantity ΔVf1*dif* of the sensor 6 is larger than the variational quantity ΔVf2*dif* of the sensor 7, the microcomputer 2 enters a step 204, selects the variational quantity ΔVf1*dif* of the sensor 6 as the variational quantity ΔVdif, and then enters a step 206. If the variational quantity ΔVf2*dif* of the sensor 7 is larger than the variational quantity ΔVf1*dif* of the sensor 6, the microcomputer 2 enters a step 205, selects the variational quantity ΔVf2*dif* of the sensor 7 as the variational quantity ΔVdif, and then enters the step 206. In the step 206, the microcomputer 2 computes an addition value ΔVa corresponding to the variational quantity ΔVdif based on a conversion map representative of the relationship between the variational quantity ΔVdif and the addition value ΔVa. The addition value ΔVa is small when the variational quantity ΔVdif is small, and it becomes larger according as the variational quantity ΔVdif becomes larger. Since the variational quantities ΔVf1*dif* and ΔVf2*dif* of the sensors 6 and 7 are detected consecutively as described above, a value of the variational quantity ΔVdif changes, and thereby a value of the addition value ΔVa also changes. Thereafter, in a step 207, the microcomputer 2 increases the integrated value ΔVt of the room acceleration sensor 8 by adding the addition value ΔVa computed at the step 206 to the integrated value ΔVt, and decides whether an increased value ΔVt+ΔVa is larger than a threshold value Vth. In this embodiment, the threshold value Vth is a predetermined value. If the increased value ΔVt+ΔVa is smaller than the threshold value Vth, the microcomputer 2 returns to the step 171 of FIG. 17. If the increased value ΔVt+ΔVa exceeds the threshold value Vth, the microcomputer 2 enters from the step 207 to a step 208, outputs the collision detection signal to the drive circuit 5, and finishes the control processing.

According to the seventh embodiment, the variational quantities ΔVf1*dif* and ΔVf2*dif* are detected consecutively, and the integrated value ΔVt of the room acceleration sensor 8 is increased by the addition value ΔVa corresponding to the variational quantity ΔVf1*dif* or ΔVf2*dif* changing every moment. Because of this, it is possible to give the variational quantities ΔVf1*dif* and ΔVf2*dif* more exactly. Also, since the addition value ΔVa is given according to the magnitude of the variational quantity ΔVf1*dif* or ΔVf2*dif*, the integrated value ΔVt of the room acceleration sensor 8 is increased according to an extent of collision, and thereby the occupant protection device 9 is control more exactly.

Figure 21:
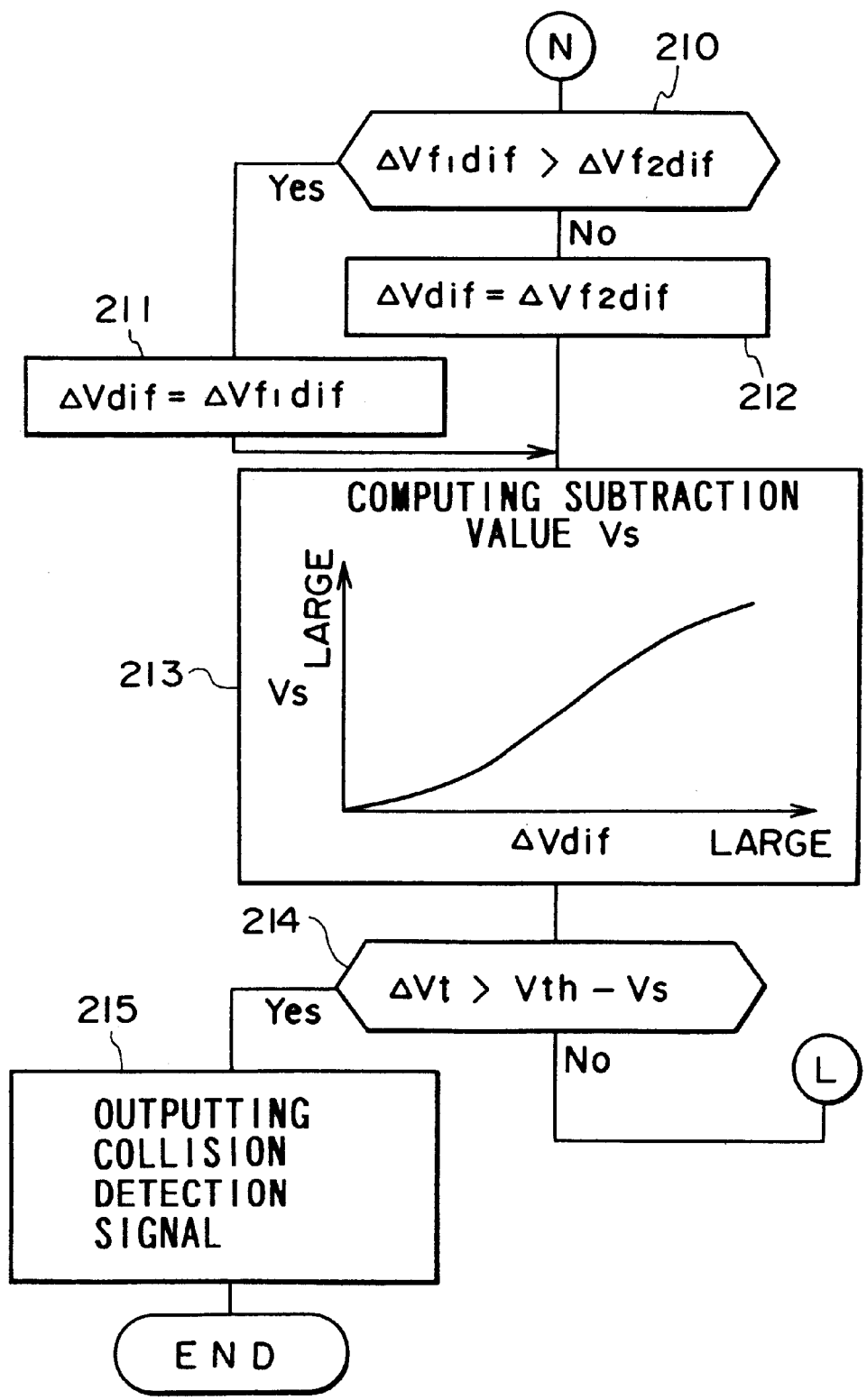
FIG. 21 is a flow diagram of the microcomputer of FIG. 1 showing an eighth embodiment of the present invention, and constitutes the flow diagrams of the microcomputer together with FIG. 17, FIG. 18 and FIG. 19.

FIG. 21 is a flow diagram of the microcomputer 2 of FIG. 1 showing an eighth embodiment. FIG. 21 is applied to the flow diagrams of FIG. 17, FIG. 18 and FIG. 19 in place of the flow diagram of FIG. 20. Terminals L and N of FIG. 21 are connected to terminals having the same signs L and N of FIG. 17 and FIG. 19. That is, FIG. 21 constitutes the flow diagrams of the microcomputer 2 together with FIG. 17, FIG. 18 and FIG. 19.

In the eighth embodiment, a large value out of the variational quantities ΔVf1*dif* and ΔVf2*dif* of the first and second front acceleration sensors 6 and 7 is selected as a variational quantity ΔVdif, and a subtraction value Vs corresponding to the variational quantity ΔVdif is computed based on a conversion map. The conversion map represents a relationship between the variational quantity ΔVdif and the subtraction value Vs subtracted from a threshold value Vth toward the integrated value ΔVt of the room acceleration sensor 8. Then, the subtraction value Vs computed based on the conversion map is subtracted from the threshold value Vth.

The microcomputer 2 enters from the flow diagram of FIG. 19 to a selection processing of steps 210–212 of FIG. 21. In the steps 210–212, a large value out of the variational quantities ΔVf1*dif* and ΔVf2*dif* of the first and second front acceleration sensors 6 and 7 is selected as the variational quantity ΔVdif. Thereafter, in a step 213, the microcomputer 2 computes the subtraction value Vs corresponding to the variational quantity ΔVdif based on the conversion map representative of the relationship between the variational quantity ΔVdif and the subtraction value Vs. The subtraction value Vs is small when the variational quantity ΔVdif is small, and it becomes larger according as the variational quantity ΔVdif becomes larger. Since the variational quantities ΔVf1*dif* and ΔVf2*dif* of the sensors 6 and 7 are detected consecutively as described above, a value of the variational quantity ΔVdif changes, and thereby a value of the subtraction value Vs also changes. Thereafter, in a step 214, the microcomputer 2 decreases the threshold value Vth by subtracting the subtraction value Vs computed at the step 213 from the threshold value Vth, and decides whether the integrated value ΔVt of the room acceleration sensor 8 is larger than the decreased threshold value Vth-Vs. If the integrated value ΔVt is smaller than the decreased threshold value Vth-Vs, the microcomputer 2 returns to the step 171 of FIG. 17. If the integrated value ΔVt exceeds the decreased threshold value Vth-Vs, the microcomputer 2 enters from the step 214 to a step 215, outputs the collision detection signal to the drive circuit 5, and finishes the control processing.

According to the eighth embodiment, instead of the increment of the integrated value ΔVt of the room acceleration sensor 8, the threshold value Vth is decreased by the subtraction value Vs corresponding to the variational quantity ΔVf1*dif* or ΔVf2*dif* changing every moment. Because of this, the threshold value Vth is decreased according to an extent of collision, and thereby the occupant protection device 9 can be control more exactly.

In the seventh and eighth embodiments, based on the variational quantity ΔVdif which is a large value out of the variational quantities ΔVf1*dif* and ΔVf2*dif* of the first and second front acceleration sensors 6 and 7, the integrated value ΔVt of the room acceleration sensor 8 is increased, or, the threshold value Vth is decreased. However, this is not intended to limit the scope of the invention. It goes without saying that the same control processing as the processing of FIG. 7 or FIG. 8 can be applied to these embodiments.

Although in the seventh and eighth embodiments the first and second front acceleration sensors 6 and 7 of FIG. 2 are used, the seventh and eighth embodiments can be also applied to the case in which the first and second front acceleration sensors 6' and 7' of FIG. 11 are used. In this case, the control processing of the steps 173–175 of FIG. 17 is applied to FIG. 12 in place of the steps 123–126, and the control processing of the steps 185–187 of FIG. 18 is applied to FIG. 13 in place of the steps 131–134.

Figure 22:
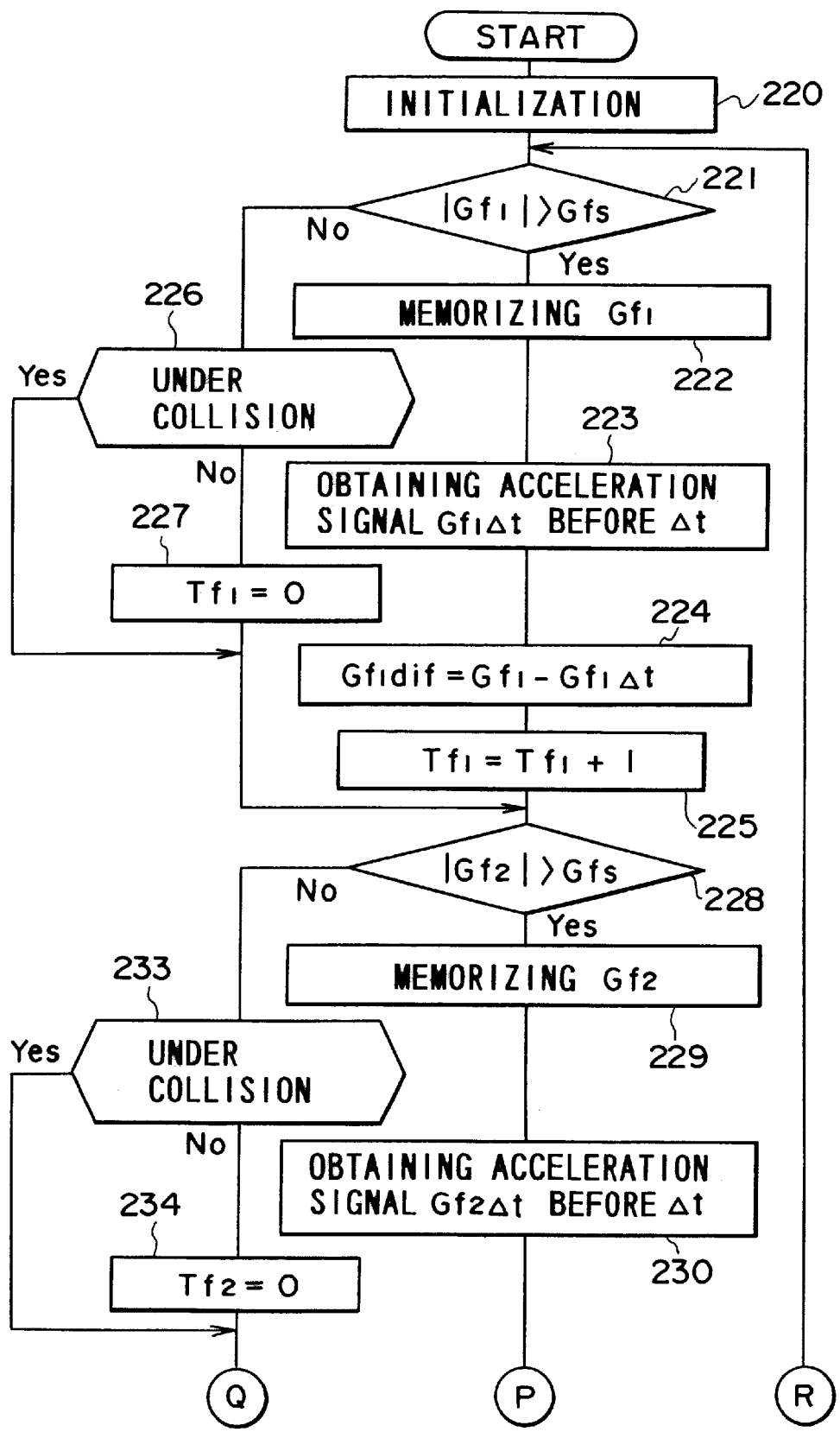
FIG. 22, FIG. 23 and FIG. 24 are flow diagrams of the microcomputer of FIG. 1 showing a ninth embodiment of the present invention.
Figure 23:
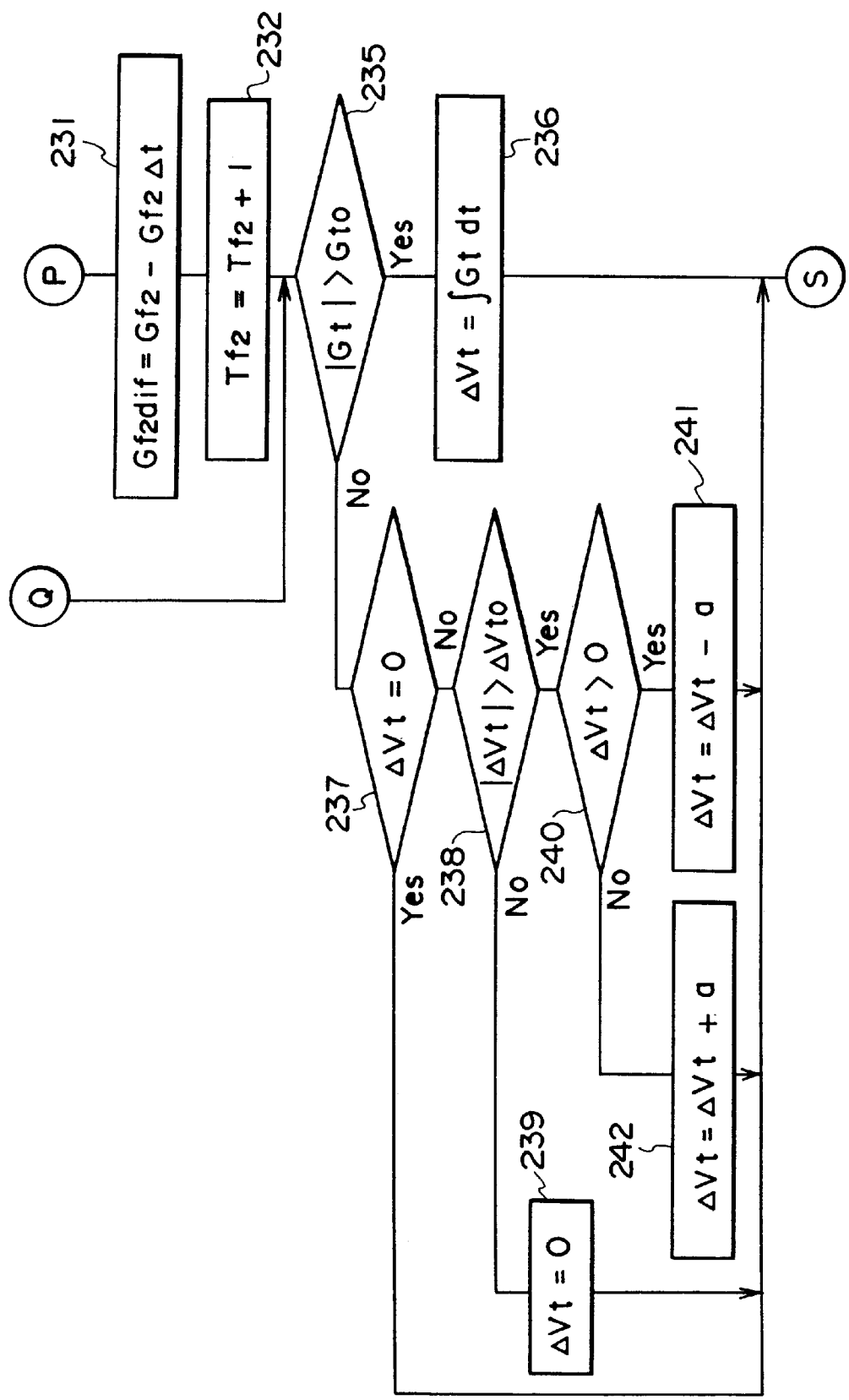
Figure 24:
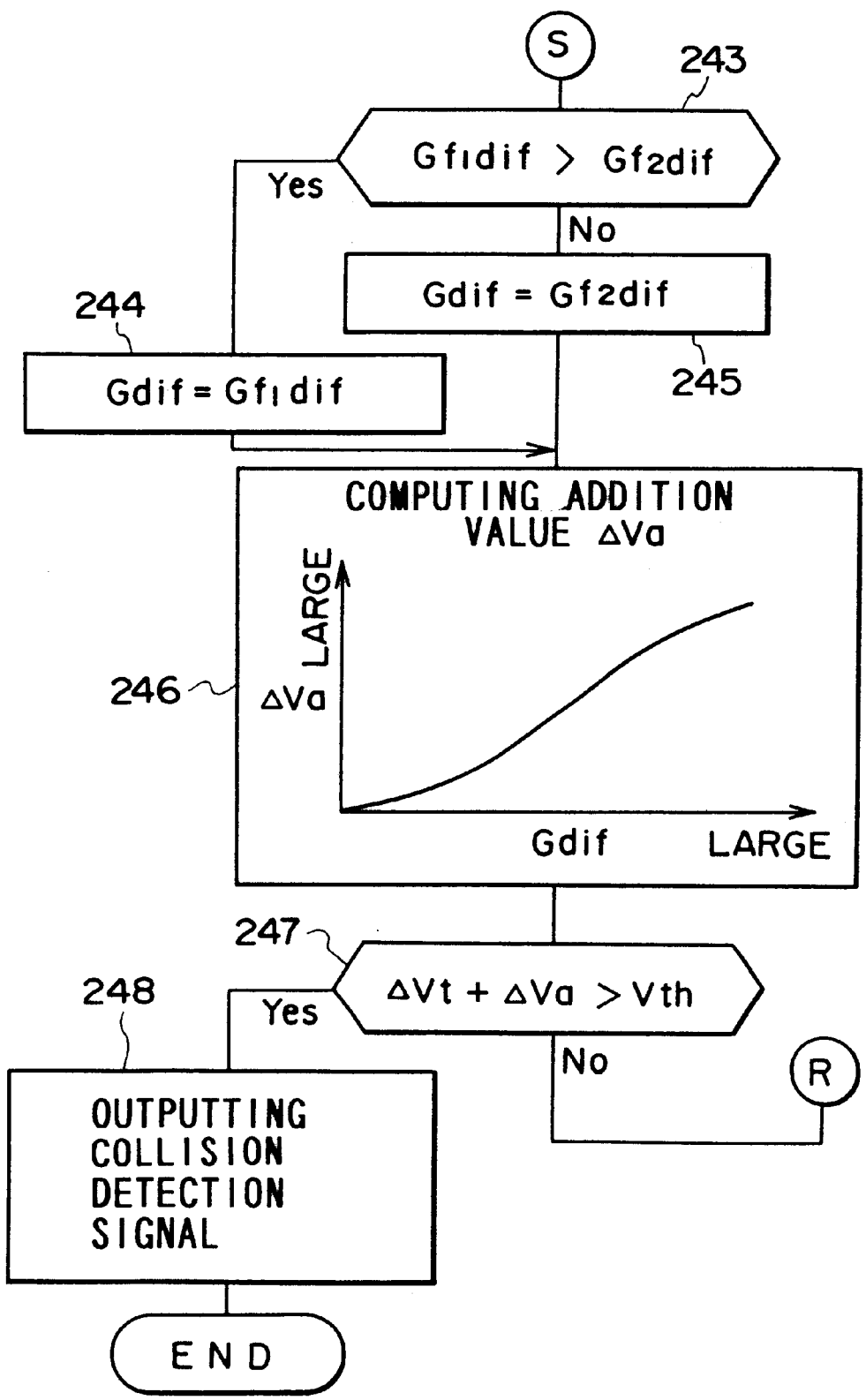

FIG. 22, FIG. 23, and FIG. 24 are flow diagrams of the microcomputer 2 of FIG. 1 showing a ninth embodiment. Terminals P and Q of FIG. 23 are connected to terminals having the same signs P and Q of FIG. 22, and terminals R and S of the FIG. 24 are connected to terminals having the same signs R and S of FIG. 22 and FIG. 23.

In the ninth embodiment, when the vehicle is under a collision, a variational quantity Gf1*dif* (Gf2*dif*) of the acceleration signal Gf1 (Gf2) of the first (second) front acceleration sensor 6 (7) is detected consecutively based on a current acceleration signal Gf1 (Gf2) of sensor 6 (7) and an acceleration signal Gf1Δt (Gf2Δt) of sensor 6 (7) before a predetermined time Δt. Therefore, the variational quantity Gf1*dif* (Gf2*dif*) changes every moment according to progress of the collision.

The microcomputer 2, when a control processing is started, enters a step 221 after an initialization of a step 220. In the step 221, the microcomputer 2 inputs the acceleration signal Gf1 of the first front acceleration sensor 6, and decides whether an absolute value of the acceleration signal Gf1 is larger than a reference value Gfs. The reference value Gfs is as described in FIG. 14 of the sixth embodiment. If the absolute value of the acceleration signal Gf1 is larger than the reference value Gfs, the microcomputer 2 recognizes that the acceleration signal Gf1 is a collision acceleration signal caused by a collision, and enters steps 222–224 for detecting the variational quantity Gf1*dif* of the acceleration signal Gf1 of the first front acceleration sensor 6. In the detection of the variational quantity Gf1*dif* of the steps 222–224, the same processing as the steps 173–175 of FIG. 17 is performed in respect to the acceleration signal Gf1. That is, in the step 222, the current acceleration signal Gf1 is memorized at an address which is based on a current time of a first soft-timer Tf1. In a following step 223, based on the current time of the first soft-timer Tf1, the acceleration signal Gf1Δt of the first front acceleration sensor 6 before the predetermined time Δt from the present time is obtained. If a time point before the predetermined time Δt is a time point before starting of the collision, a value "0" is given as the acceleration signal Gf1Δt before the predetermined time Δt. Thereafter, in a step 224, the microcomputer 2 detects the variational quantity Gf1*dif* by subtracting the acceleration signal Gf1Δt before the predetermined time Δt from the current acceleration signal Gf1, and then enters a step 225. In the step 225, the first soft-timer Tf1 is increased by +1. Thereafter, the microcomputer 2 enters a step 228. The first soft-timer Tf1 is reset to "0" in the initialization of the step 220 and a step 227, and is increased by +1 in the step 225. By this, the first soft-timer Tf1 is designed to count lapse of time from the reset state of "0" when a collision has been recognized based on the first front acceleration sensor 6. When the vehicle is under a collision, since the microcomputer 2 almost goes through the steps 222, 223 and 224, the variational quantity Gf1*dif* of the acceleration signal Gf1 changing every moment is detected consecutively.

On the other hand, in the step 221, if the absolute value of the acceleration signal Gf1 is smaller than the reference value Gfs, the microcomputer 2 decides in the step 226 whether the vehicle is under the collision. If the vehicle is not under the collision, the microcomputer 2 resets the first soft-timer Tf1 to "0" in the step 227, and then enters the step 228. If the vehicle is under the collision, the microcomputer 2 directly enters the step 228 without resetting the first soft-timer Tf1. The decision of whether the vehicle is under the collision is as described in the sixth embodiment of FIG. 14–FIG. 16.

In the step 228, the microcomputer 2 inputs the acceleration signal Gf2 of the second front acceleration sensor 7, and decides whether an absolute value of the acceleration signal Gf2 is larger than the reference value Gfs. If the absolute value of the acceleration signal Gf2 is larger than the reference value Gfs, the microcomputer 2 recognizes that the acceleration signal Gf1 is a collision acceleration signal caused by the collision, and enters steps 229–231 for detecting the variational quantity Gf2*dif* of the acceleration signal Gf2 of the second front acceleration sensor 7. In the detection of the variational quantity Gf2*dif* of the steps 229–231, the same processing as the steps 185–187 of FIG. 18 is performed in respect to the acceleration signal Gf2. That is, in the step 229, the current acceleration signal Gf2 is memorized at an address which is based on a current time of a second soft-timer Tf2. In a following step 230, based on the current time of the second soft-timer Tf2, the acceleration signal Gf2Δt of the second front acceleration sensor 7 before the predetermined time Δt from the present time is obtained. If a time point before the predetermined time Δt is a time point before starting of the collision, a value "0" is given as the acceleration signal Gf2Δt before the predetermined time Δt. Thereafter, in a step 231, the microcomputer 2 detects the variational quantity Gf2*dif* by subtracting the acceleration signal Gf2Δt before the predetermined time Δt from the current acceleration signal Gf2, and then enters a step 232. In the step 232, the second soft-timer Tf2 is increased by +1. Thereafter, the microcomputer 2 enters a step 235. The second soft-timer Tf2 is reset to "0" in the initialization of the step 220 and a step 234, and is increased by +1 in the step 232. By this, the second soft-timer Tf2 is designed to count lapse of time from the reset state of "0" when a collision has been recognized based on the second front acceleration sensor 7. When the vehicle is under a collision, since the microcomputer 2 almost goes through the steps 229, 230 and 231, the variational quantity Gf2*dif* of the acceleration signal Gf2 changing every moment is detected consecutively.

On the other hand, in the step 228, if the absolute value of the acceleration signal Gf2 is smaller than the reference value Gfs, the microcomputer 2 decides in the step 233 whether the vehicle is under the collision. The microcomputer 2, if the vehicle is not under the collision, resets the second soft-timer Tf2 to "0" in the step 234, and then enters the step 235. If the vehicle is under the collision, the microcomputer 2 directly enters the step 235 without resetting the second signal Gt of the room acceleration sensor 8, and decides whether an absolute value of the acceleration signal Gt is larger than a reference value Gto. The reference value Gto is the room reference value Gto described in the first embodiment. If the absolute value of the acceleration signal Gt is larger than the reference value Gto, the microcomputer 2 computes an integrated value ΔVt of the acceleration signal Gt in a step 236, and then enters a step 243 of FIG. 24. In the step 235, if the absolute value of the acceleration signal Gt is smaller than the reference value Gto, the microcomputer 2 enters a reset processing of steps 237–242, and goes to the step 243 of FIG. 24 after the reset processing. In the reset processing of the steps 237–242, the same processing as the reset processing of the steps 69–74 of FIG. 6 is executed.

In the step 243 of FIG. 24, the microcomputer 2 makes a comparison between the variational quantity Gf1*dif* of the first front acceleration sensor 6 and the variational quantity Gf2*dif* of the second front acceleration sensor 7. If the variational quantity Gf1*dif* of the sensor 6 is larger than the variational quantity Gf2*dif* of the sensor 7, the microcomputer 2 enters a step 244, selects the variational quantity Gf1*dif* of the sensor 6 as a variational quantity Gdif, and then enters a step 246. If the variational quantity Gf2*dif* of the sensor 7 is larger than the variational quantity Gf1*dif* of the sensor 6, the microcomputer 2 enters a step 245, selects the variational quantity Gf2*dif* of the sensor 7 as the variational quantity Gdif, and then enters the step 246. In the step 246, the microcomputer 2 computes an addition value ΔVa corresponding to the variational quantity Gdif based on a conversion map representative of the relationship between the variational quantity Gdif and the addition value ΔVa. The addition value ΔVa is small when the variational quantity Gdif is small, and it becomes larger according as the variational quantity Gdif becomes larger. Since the variational quantities Gf1*dif* and Gf2*dif* of the sensors 6 and 7 are detected consecutively as described above, a value of the variational quantity Gdif changes, and thereby a value of the addition value ΔVa also changes. Thereafter, in a step 247, the microcomputer 2 increases the integrated value ΔVt of the room acceleration sensor 8 by adding the addition value ΔVa computed at the step 246 to the integrated value ΔVt, and decides whether an increased value ΔVt+ΔVa is larger than a threshold value Vth. In this embodiment, the threshold value Vth is a predetermined value. If the increased value ΔVt+ΔVa is smaller than the threshold value Vth, the microcomputer 2 returns to the step 221 of FIG. 22, and the aforementioned control processing is repeated. If the increased value ΔVt+ΔVa exceeds the threshold value Vth, the microcomputer 2 enters from the step 247 to a step 248, outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 such as an airbag is driven.

According to the ninth embodiment, the variational quantities Gf1*dif* and Gf2*dif* of the acceleration signals Gf1 and Gf2 of the first and second front acceleration sensor 6 and 7 are detected consecutively, and the integrated value ΔVt of the room acceleration sensor 8 is increased by the addition value ΔVa corresponding to the variational quantity Gf1*dif* or Gf2*dif* changing every moment. Because of this, since the integrated value ΔVt of the room acceleration sensor 8 is increased according to an extent of collision, the occupant protection device 9 can be controlled more exactly.

Although in the ninth embodiment the integrated value ΔVt of the room acceleration sensor 8 is increased based on the conversion map, this is not intended to limit the scope of the invention. It goes without saying that the same control processing as FIG. 7, FIG. 8 or FIG. 21 can be applied to this embodiment.

Although two front acceleration sensors are used in each of the embodiments mentioned above, this is not intended to limit the scope of the invention. The number of front acceleration sensors can be one, or more than two. When only one front acceleration sensor is used, it is desirable that the front acceleration sensor is provided in a center part of a vehicle front where an impact of collision can easily be absorbed, for example, near a radiator like a center part of a radiator mount holding a radiator. Since such a part is relatively soft in a car body, a collision impact can easily be absorbed and transmission of a collision acceleration to the floor tunnel of vehicle tends to be weakened. When the front acceleration sensor is provided in such a part, in case of a collision in which transmission of the collision acceleration to the floor tunnel is weakened, for example, a center pole collision in which a center part of a car front collides against a pole such as an electric light pole, and an under-ride collision in which a car front goes under a back part of a truck and so on, the collision acceleration can be detected early. It goes without saying that the front acceleration sensor attached as mentioned above can be included in each of the embodiments of the present invention.

From foregoing it will now be apparent that a new and improved control apparatus of an occupant protection device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle and giving a sensor output representative thereof; and a control unit, connected to said room acceleration sensor and said front acceleration sensor, for receiving the acceleration signal of said room acceleration sensor and the sensor output of said front acceleration sensor, and for driving the occupant protection device when integrated value of the acceleration signal of said room acceleration sensor exceeds a predetermined threshold value, said control unit detecting a variational quanitiy of the sensor output of said acceleration sensor based on sensor outputs of said front acceleration sensor at two different time points when the sensor output of said front acceleration sensor is a output caused by a collision of the vehicle, and increasing the integrated value of said room acceleration based on the variational quantity of said front acceleration sensor.

2. The control apparatus of claim 1, wherein said control unit, when the variational quantity of said front acceleration sensor is larger than a predetermined value, increases the integrated value of said room acceleration sensor by adding a predetermined addition value to the integrated value.

3. The control apparatus of claim 2, wherein said control unit, when the variational quantity of said front acceleration sensor is not larger than the predetermined value, decides whether the integrated value of said room acceleration sensor is larger than the threshold value, and drives the occupant protection device when the integrated value is larger than the threshold value.

4. The control apparatus of claim 1, having a plurality of front acceleration sensors, wherein:

said control unit detects respectively variational quantities of sensor outputs of said plurality of front acceleration sensors, and increases the integrated value of said room acceleration sensor by adding a predetermined addition value to the integrated value when at least one of the variational quantities of said plurality of front acceleration sensors is larger than a predetermined value.

5. The control apparatus of claim 4, wherein said control unit, when none of the variational quantities of said plurality of front acceleration sensors is larger than the predetermined value, decides whether the integrated value of said room acceleration sensor is larger than the threshold value, and drives the occupant protection device when the integrated value is larger than the threshold value.

6. The control apparatus of claim 4, having first and second front acceleration sensors, wherein said first and second front acceleration sensors are provided near right and left portions of a radiator of a vehicle front, respectively.

7. The control apparatus of claim 1, wherein:

said control unit includes a conversion map representative of a relationship between the variational quantity and an addition value added to the integrated value of the acceleration signal of said room acceleration sensor, the conversion map giving a small value as the addition value when the variational quantity is small, and giving a larger value as the addition value according as the variational quantity becomes larger, and said control unit computes the addition value corresponding to the variational quantity of said front acceleration sensor based on the conversion map, and increases the integrated value of said room acceleration sensor by adding the addition value computed based on the conversion map to the integrated value.

8. The control apparatus of claim 1, having a plurality of front acceleration sensors, wherein:

said control unit includes a conversion map representative of a relationship between a selected variational quantity and an addition value added to the integrated value of the acceleration signal of said room acceleration sensor, the conversion map giving a small value as the addition value when the selected variational quantity is small, and giving a larger value as the addition value according as the selected variational quantity becomes larger, and said control unit detects respectively variational quantities of sensor outputs of said plurality of front acceleration sensors, selects a largest value out of these variational quantities, computes the addition value corresponding to the selected variational quantity based on the conversion map, and increases the integrated value of said room acceleration sensor by adding the addition value computed based on the conversion map to the integrated value.

9. The control apparatus of claim 8, having first and second front acceleration sensors, wherein said first and second front acceleration sensors are provided near right and left portions of a radiator of a vehicle front, respectively.

10. The control apparatus of claim 1, wherein said control unit detects a sensor output of said front acceleration sensor at a predetermined first time point after starting of the collision and a sensor output of said front acceleration sensor at a second time point after lapse of a predetermined time from the first time point, and detects the variational quantity of the sensor output of said front acceleration sensor by computing a difference between the sensor outputs of the first and second time points.

11. The control apparatus of claim 10, wherein:

said control unit includes a conversion map representative of a relationship between the variational quantity and an addition value added to the integrated value of the acceleration signal of said room acceleration sensor, the conversion map giving a small value as the addition value when the variational quantity is small, and giving a larger value as the addition value according as the variational quantity becomes larger, said control unit computes the addition value corresponding to the variational quantity of said front acceleration sensor based on the conversion map, and increases the integrated value of said room acceleration sensor by adding the addition value computed based on the conversion map to the integrated value, and said control unit, when the variational quantity of said front acceleration sensor has not been detected yet, decides whether the integrated value of said room acceleration sensor is larger than the threshold value, and drives the occupant protection device when the integrated value is larger than the threshold value.

12. The control apparatus of claim 10, having a plurality of front acceleration sensors, wherein:

said control unit includes a conversion map representative of a relationship between a selected variational quantity and an addition value added to the integrated value of the acceleration signal of said room acceleration sensor, the conversion map giving a small value as the addition value when the selected variational quantity is small, and giving a larger value as the addition value according as the selected variational quantity becomes larger, said control unit detects respectively variational quantities of sensor outputs of said plurality of front acceleration sensors, selects a largest value out of these variational quantities, computes the addition value corresponding to the selected variational quantity based on the conversion map, and increases the integrated value of said room acceleration sensor by adding the addition value computed based on the conversion map to the integrated value, and said control unit, when none of the variational quantities of said plurality of front acceleration sensors has been detected yet, decides whether the integrated value of said room acceleration sensor is larger than the threshold value, and drives the occupant protection device when the integrated value is larger than the threshold value.

13. The control apparatus of claim 12, having first and second front acceleration sensors, wherein said first and second front acceleration sensors are provided near right and left portions of a radiator of a vehicle front, respectively.

14. The control apparatus of claim 1, wherein said control unit detects successively the variational quantity of the sensor output of said front acceleration sensor by computing a difference between a current sensor output of said front acceleration sensor and a sensor output of said front acceleration sensor before a predetermined time whenever receiving the sensor output caused by the collision from said front acceleration sensor.

15. The control apparatus of claim 14, wherein:

said control unit includes a conversion map representative of a relationship between the variational quantity and an addition value added to the integrated value of the acceleration signal of said room acceleration sensor, the conversion map giving a small value as the addition value when the variational quantity is small, and giving a larger value as the addition value according as the variational quantity becomes larger, and said control unit computes the addition value corresponding to the variational quantity of said front acceleration sensor based on the conversion map, and increases the integrated value of said room acceleration sensor by adding the addition value computed based on the conversion map to the integrated value.

16. The control apparatus of claim 14, having a plurality of front acceleration sensors, wherein:

said control unit includes a conversion map representative of a relationship between a selected variational quantity and an addition value added to the integrated value of the acceleration signal of said room acceleration sensor, the conversion map giving a small value as the addition value when the selected variational quantity is small, and giving a larger value as the addition value according as the selected variational quantity becomes larger, and said control unit detects respectively variational quantities of sensor outputs of said plurality of front acceleration sensors, selects a largest value out of these variational quantities, computes the addition value corresponding to the selected variational quantity based on the conversion map, and increases the integrated value of said room acceleration sensor by adding the addition value computed based on the conversion map to the integrated value.

17. The control apparatus of claim 16, having first and second front acceleration sensors, wherein said first and second front acceleration sensors are provided near right and left portions of a radiator of the vehicle front, respectively.

18. The control apparatus of claim 1, wherein said control unit has a reference value for deciding whether the sensor output of said front acceleration sensor is the sensor output caused by the collision of the vehicle, and, when the sensor output of said front acceleration sensor is larger than the reference value, recognizes that the sensor output is the sensor output caused by the collision.

19. The control apparatus of claim 1, wherein said front acceleration sensor is provided near a radiator of a center part of the vehicle front.

20. The control apparatus of claim 1, wherein:

said front acceleration sensor outputs an acceleration signal representative of the acceleration of the vehicle as the sensor output, and said control unit computes an integrated value of the acceleration signal of said front acceleration sensor, and detects the variational quantity of the integrated value.

21. The control apparatus of claim 20, wherein said front acceleration sensor comprises:

a piezo-electric element for detecting the acceleration;

an amplifier circuit for receiving voltage outputs of both ends of the piezo-electric element, and for outputting the acceleration signal by differentially amplifying the voltage outputs of the piezo-electric element;

a bias resistor circuit provided at an input side of the amplifier circuit;

a condenser inserted in parallel with the piezo-electric element so as to lower a lower cut-off frequency without increasing resistance values of the bias resistor circuit;

temperature compensation means for adjusting a gain of the amplifier circuit so that an output-temperature characteristic of the piezo-electric element is compensated; and a reference voltage circuit for giving a reference potential to the amplifier circuit and the bias resistor circuit.

22. The control apparatus of claim 1, wherein:

said front acceleration sensor outputs an acceleration signal representative of the acceleration of the vehicle as the sensor output, and said control unit detects the variational quantity of the acceleration signal given from said front acceleration sensor.

23. The control apparatus of claim 22, wherein said front acceleration sensor comprises:

a piezo-electric element for detecting the acceleration;

an amplifier circuit for receiving voltage outputs of both ends of the piezo-electric element, and for outputting the acceleration signal by differentially amplifying the voltage outputs of the piezo-electric element;

a bias resistor circuit provided at an input side of the amplifier circuit;

a condenser inserted in parallel with the piezo-electric element so as to lower a lower cut-off frequency without increasing resistance values of the bias resistor circuit;

temperature compensation means for adjusting a gain of the amplifier circuit so that an output-temperature characteristic of the piezo-electric element is compensated; and a reference voltage circuit for giving a reference potential to the amplifier circuit and the bias resistor circuit.

24. The control apparatus of claim 1, wherein:

said front acceleration sensor outputs an integrated value of an acceleration signal representative of the acceleration of the vehicle as the sensor output, and said control unit detects the variational quantity of the integrated value given from said front acceleration sensor.

25. The control apparatus of claim 24, wherein said front acceleration sensor comprises:
- a piezo-electric element for detecting the acceleration;
- an amplifier circuit for receiving voltage outputs of both ends of the piezo-electric element, for differentially amplifying and integrating the voltage outputs of the piezo-electric element, and for outputting the integrated value of the acceleration signal;
- a bias resistor circuit provided at an input side of the amplifier circuit;
- a condenser inserted in parallel with the piezo-electric element so as to lower a lower cut-off frequency without increasing resistance values of the bias resistor circuit;
- temperature compensation means for adjusting a gain of the amplifier circuit so that an output-temperature characteristic of the piezo-electric element is compensated; and
- a reference voltage circuit for giving a reference potential to the amplifier circuit and the bias resistor circuit.

26. A control apparatus of an occupant protection device having a room acceleration sensor, provided in a room of a vehicle, for detecting an acceleration of the vehicle and outputting an acceleration signal representative thereof, comprising:
- at least one front acceleration sensor, provided in a front part of the vehicle, for detecting the acceleration of the vehicle and giving a sensor output representative thereof; and
- a control unit, connected to said room acceleration sensor and said front acceleration sensor, for receiving the acceleration signal of said room acceleration sensor and the sensor output of said front acceleration sensor, and for driving the occupant protection device when an integrated value of the acceleration signal of said room acceleration sensor exceeds a threshold value,
- said control unit detecting a variational quantity of the sensor output of said front acceleration sensor based on sensor outputs of said front acceleration sensor at two different time points when the sensor output of said front acceleration sensor is a sensor output caused by a collision of the vehicle, and decreasing the threshold value toward the integrated value of the room acceleration sensor based on the variational quantity of said front acceleration sensor.

27. The control apparatus of claim 26, wherein said control unit, when the variational quantity of said front acceleration sensor is larger than a predetermined value, decreases the threshold value by subtracting a predetermined subtraction value from the threshold value.

28. The control apparatus of claim 27, wherein said control unit, when the variational quantity of said front acceleration sensor is not larger than the predetermined value, decides whether the integrated value of said room acceleration sensor is larger than the threshold value, and drives the occupant protection device when the integrated value is larger than the threshold value.

29. The control apparatus of claim 26, having a plurality of front acceleration sensors, wherein:
- said control unit detects respectively variational quantities of sensor outputs of said plurality of front acceleration sensors, and decreases the threshold value by subtracting a predetermined subtraction value from the threshold value when at least one of the variational quantities of said plurality of front acceleration sensors is larger than a predetermined value.

30. The control apparatus of claim 29, wherein said control unit, when none of the variational quantities of said plurality of front acceleration sensors is larger than the predetermined value, decides whether the integrated value of said room acceleration sensor is larger than the threshold value, and drives the occupant protection device when the integrated value is larger than the threshold value.

31. The control apparatus of claim 26, having first and second front acceleration sensors, wherein said first and second front acceleration sensors are provided near right and left portions of a radiator of a vehicle front, respectively.

32. The control apparatus of claim 26, wherein:
- said control unit includes a conversion map representative of a relationship between the variational quantity and a subtraction value subtracted from the threshold value, the conversion map giving a small value as the subtraction value when the variational quantity is small, and giving a larger value as the subtraction value according as the variational quantity becomes larger, and
- said control unit computes the subtraction value corresponding to the variational quantity of said front acceleration sensor based on the conversion map, and decreases the threshold value by subtracting the subtraction value computed based on the conversion map from the threshold value.

33. The control apparatus of claim 26, having a plurality of front acceleration sensors, wherein:
- said control unit includes a conversion map representative of a relationship between a selected variational quantity and a subtraction value subtracted from the threshold value, the conversion map giving a small value as the subtraction value when the selected variational quantity is small, and giving a larger value as the subtraction value according as the selected variational quantity becomes larger, and
- said control unit detects respectively variational quantities of sensor outputs of said plurality of front acceleration sensors, selects a largest value out of these variational quantities, computes the subtraction value corresponding to the selected variational quantity based on the conversion map, and decreases the threshold value by subtracting the subtraction value computed based on the conversion map from the threshold value.

34. The control apparatus of claim 33, having first and second front acceleration sensors, wherein said first and second front acceleration sensors are provided near right and left portions of a radiator of a vehicle front, respectively.

35. The control apparatus of claim 26, wherein said control unit detects a sensor output of said front acceleration sensor at a predetermined first time point after starting of the collision and a sensor output of said front acceleration sensor at a second time point after lapse of a predetermined time from the first time point, and detects the variational quantity of the sensor output of said front acceleration sensor by computing a difference between the sensor outputs of the first and second time points.

36. The control apparatus of claim 35, wherein:
- said control unit includes a conversion map representative of a relationship between the variational quantity and a subtraction value subtracted from the threshold value, the conversion map giving a small value as the subtraction value when the variational quantity is small, and giving a larger value as the subtraction value according as the variational quantity becomes larger,
- said control unit computes the subtraction value corresponding to the variational quantity of said front acceleration sensor based on the conversion map, and decreases the threshold value by subtracting the subtraction value computed based on the conversion map from the threshold value, and said control unit, when the variational quantity of said front acceleration sensor has not been detected yet, decides whether the integrated value of said room acceleration sensor is larger than the threshold value, and drives the occupant protection device when the integrated value is larger than the threshold value.

37. The control apparatus of claim 35, having a plurality of front acceleration sensors, wherein:

said control unit includes a conversion map representative of a relationship between a selected variational quantity and a subtraction value subtracted from the threshold value, the conversion map giving a small value as the subtraction value when the selected variational quantity is small, and giving a larger value as the subtraction value according as the selected variational quantity becomes larger, said control unit detects respectively variational quantities of sensor outputs of said plurality of front acceleration sensors, selects a largest value out of these variational quantities, computes the subtraction value corresponding to the selected variational quantity based on the conversion map, and decreases the threshold value by subtracting the subtraction value computed based on the conversion map from the threshold value, and said control unit, when none of the variational quantities of said plurality of front acceleration sensors has been detected yet, decides whether the integrated value of said room acceleration sensor is larger than the threshold value, and drives the occupant protection device when the integrated value is larger than the threshold value.

38. The control apparatus of claim 37, having first and second front acceleration sensors, wherein said first and second front acceleration sensors are provided near right and left portions of a radiator of a vehicle front, respectively.

39. The control apparatus of claim 26, wherein said control unit detects successively the variational quantity of the sensor output of said front acceleration sensor by computing a difference between a current sensor output of said front acceleration sensor and a sensor output of said front acceleration sensor before a predetermined time whenever receiving the sensor output caused by the collision from said front acceleration sensor.

40. The control apparatus of claim 39, wherein:

said control unit includes a conversion map representative of a relationship between the variational quantity and a subtraction value subtracted from the threshold value, the conversion map giving a small value as the subtraction value when the variational quantity is small, and giving a larger value as the subtraction value according as the variational quantity becomes larger, and said control unit computes the subtraction value corresponding to the variational quantity of said front acceleration sensor based on the conversion map, and decreases the threshold value by subtracting the subtraction value computed based on the conversion map from the threshold value.

41. The control apparatus of claim 39, having a plurality of front acceleration sensors, wherein:

said control unit includes a conversion map representative of a relationship between a selected variational quantity and a subtraction value subtracted from the threshold value, the conversion map giving a small value as the subtraction value when the selected variational quantity is small, and giving a larger value as the subtraction value according as the selected variational quantity becomes larger, and said control unit detects respectively variational quantities of sensor outputs of said plurality of front acceleration sensors, selects a largest value out of these variational quantities, computes the subtraction value corresponding to the selected variational quantity based on the conversion map, and decreases the threshold value by subtracting the subtraction value computed based on the conversion map from the threshold value.

42. The control apparatus of claim 41, having first and second front acceleration sensors, wherein said first and second front acceleration sensors are provided near right and left portions of a radiator of a vehicle front, respectively.

43. The control apparatus of claim 26, wherein said control unit has a reference value for deciding whether the sensor output of said front acceleration sensor is the sensor output caused by the collision of the vehicle, and, when the sensor output of said front acceleration sensor is larger than the reference value, recognizes that the sensor output is the sensor output caused by the collision.

44. The control apparatus of claim 26, wherein said front acceleration sensor is provided near a radiator of a center part of the vehicle front.

45. The control apparatus of claim 26, wherein:

said front acceleration sensor outputs an acceleration signal representative of the acceleration of the vehicle as the sensor output, and said control unit computes an integrated value of the acceleration signal of said front acceleration sensor, and detects the variational quantity of the integrated value.

46. The control apparatus of claim 45, wherein said front acceleration sensor comprises:

a piezo-electric element for detecting the acceleration;

an amplifier circuit for receiving voltage outputs of both ends of the piezo-electric element, and for outputting the acceleration signal by differentially amplifying the voltage outputs of the piezo-electric element;

a bias resistor circuit provided at an input side of the amplifier circuit;

a condenser inserted in parallel with the piezo-electric element so as to lower a lower cut-off frequency without increasing resistance values of the bias resistor circuit;

temperature compensation means for adjusting a gain of the amplifier circuit so that an output-temperature characteristic of the piezo-electric element is compensated; and a reference voltage circuit for giving a reference potential to the amplifier circuit and the bias resistor circuit.

47. The control apparatus of claim 26, wherein:

said front acceleration sensor outputs an acceleration signal representative of the acceleration of the vehicle as the sensor output, and said control unit detects the variational quantity of the acceleration signal given from said front acceleration sensor.

48. The control apparatus of claim 47, wherein said front acceleration sensor comprises:

a piezo-electric element for detecting the acceleration;

an amplifier circuit for receiving voltage outputs of both ends of the piezo-electric element, and for outputting the acceleration signal by differentially amplifying the voltage outputs of the piezo-electric element;

a bias resistor circuit provided at an input side of the amplifier circuit;

a condenser inserted in parallel with the piezo-electric element so as to lower a lower cut-off frequency without increasing resistance values of the bias resistor circuit;

temperature compensation means for adjusting a gain of the amplifier circuit so that an output-temperature characteristic of the piezo-electric element is compensated; and a reference voltage circuit for giving a reference potential to the amplifier circuit and the bias resistor circuit.

49. The control apparatus of claim 26, wherein:

said front acceleration sensor outputs an integrated value of an acceleration signal representative of the acceleration of the vehicle as the sensor output, and said control unit detects the variational quantity of the integrated value given from said front acceleration sensor.

50. The control apparatus of claim 49, wherein said front acceleration sensor comprises:

a piezo-electric element for detecting the acceleration;

an amplifier circuit for receiving voltage outputs of both ends of the piezo-electric element, for differentially amplifying and integrating the voltage outputs of the piezo-electric element, and for outputting the integrated value of the acceleration signal;

a bias resistor circuit provided at an input side of the amplifier circuit;

a condenser inserted in parallel with the piezo-electric element so as to lower a lower cut-off frequency without increasing resistance values of the bias resistor circuit;

temperature compensation means for adjusting a gain of the amplifier circuit so that an output-temperature characteristic of the piezo-electric element is compensated; and a reference voltage circuit for giving a reference potential to the amplifier circuit and the bias resistor circuit.

* * * * *